United States Patent [19]

Haruki et al.

[11] Patent Number: 5,111,301

[45] Date of Patent: May 5, 1992

[54] AUTOMATIC EXPOSURE ADJUSTING APPARATUS FOR AUTOMATICALLY ADJUSTING EXPOSURE BY FUZZY INFERENCE

[75] Inventors: Toshinobu Haruki, Shijonawate; Kenichi Kikuchi, Osaka, both of Japan

[73] Assignee: Sanyo Electric Co., Ltd., Japan

[21] Appl. No.: 544,669

[22] Filed: Jun. 26, 1990

[30] Foreign Application Priority Data

| Jun. 28, 1989 | [JP] | Japan | 1-166134 |
| Sep. 12, 1989 | [JP] | Japan | 1-236242 |
| Sep. 12, 1989 | [JP] | Japan | 1-236243 |
| Sep. 12, 1989 | [JP] | Japan | 1-236245 |
| Sep. 12, 1989 | [JP] | Japan | 1-236246 |

[51] Int. Cl.$^5$ ............................................. H04N 5/238
[52] U.S. Cl. .................... 358/228; 358/209; 358/213.19
[58] Field of Search ......... 358/228, 227, 209, 213.19, 358/213.13, 909

[56] References Cited

U.S. PATENT DOCUMENTS

| 4,050,085 | 9/1977 | Prince et al. | 358/219 |
| 4,306,787 | 12/1981 | Fukuhara et al. | 354/31 |
| 4,409,620 | 10/1983 | Enomoto | 358/228 |
| 4,429,969 | 2/1984 | Saegusa | 354/41 X |
| 4,443,080 | 4/1984 | Saegusa | 354/432 |
| 4,476,383 | 10/1984 | Fukuhara et al. | 250/214 P |
| 4,516,172 | 5/1985 | Miyata et al. | 358/228 |
| 4,638,365 | 1/1987 | Kato | 358/228 |
| 4,843,476 | 6/1989 | Fujioka et al. | 358/228 |
| 4,843,478 | 6/1989 | Fujioka et al. | 358/228 |
| 4,969,045 | 11/1990 | Haruki et al. | 358/228 |
| 5,029,314 | 7/1991 | Katsumi et al. | 355/208 |

FOREIGN PATENT DOCUMENTS

| 0269053 | 6/1988 | European Pat. Off. | 5/238 |
| 57-41079 | 3/1982 | Japan . | |
| 62-110369 | 5/1987 | Japan . | |
| 62-296673 | 12/1987 | Japan . | |
| 2219461 | 6/1989 | United Kingdom | 5/238 |

Primary Examiner—James J. Groody
Assistant Examiner—Tuan V. Ho
Attorney, Agent, or Firm—Peter L. Michaelson

[57] ABSTRACT

An automatic exposure adjusting apparatus for use in a video camera automatically adjusts exposure based on a video signal obtained from an image sensing circuit. The automatic exposure adjusting apparatus detects a luminance signal level of the video signal and detects a first mean value which is a simple mean value per unit area of an image sensed picture. The automatic exposure adjusting apparatus also outputs a second mean value weighted every area in accordance with a luminance distribution in the image sensed picture. The automatic exposure adjusting apparatus controls the adjustment of exposure based on the first and second mean values. Such weighting of the luminance level in accordance with the luminance distribution is carried out based on the fuzzy inference.

30 Claims, 10 Drawing Sheets

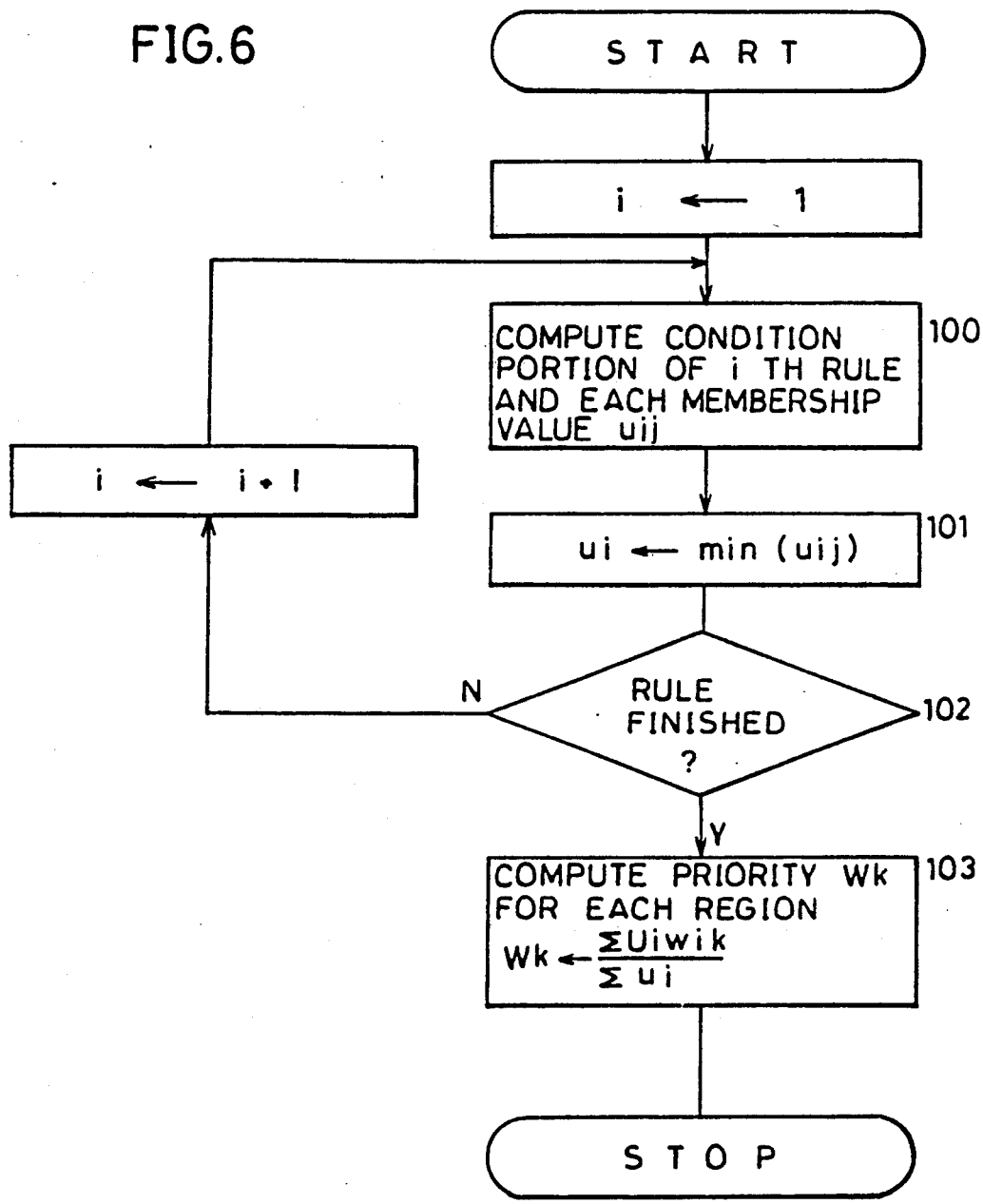

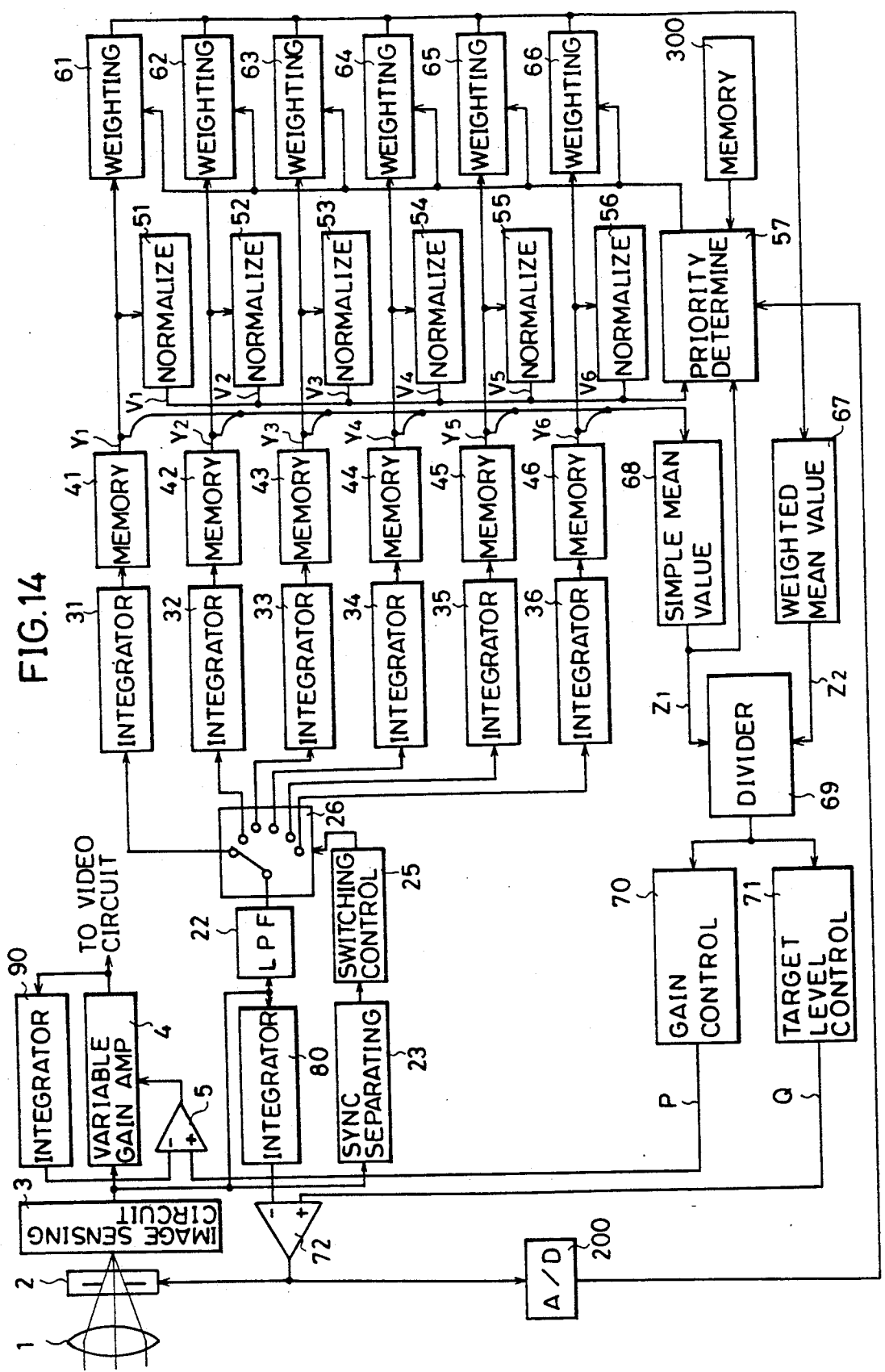

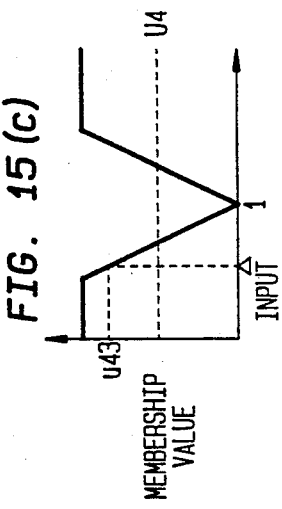
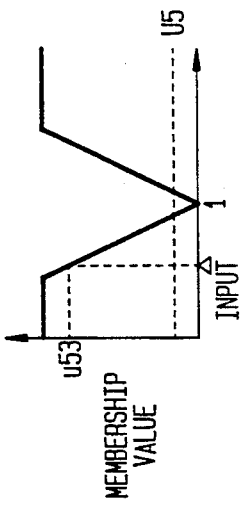
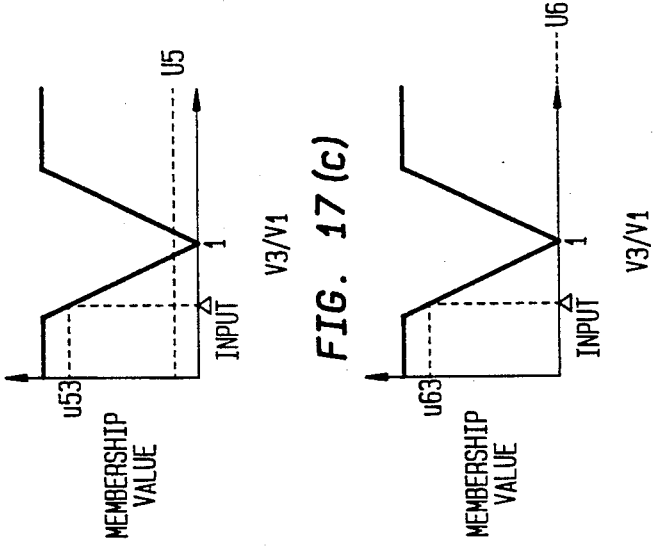
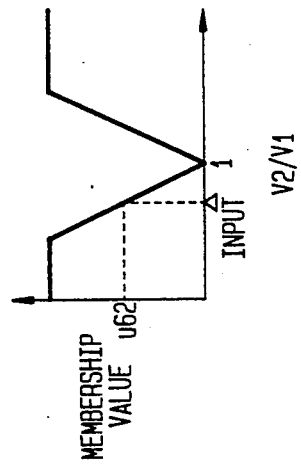
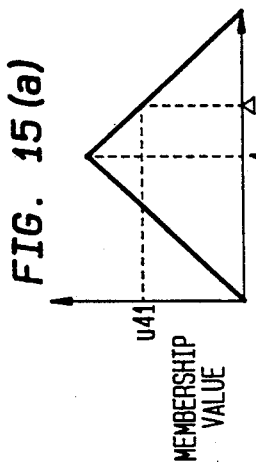
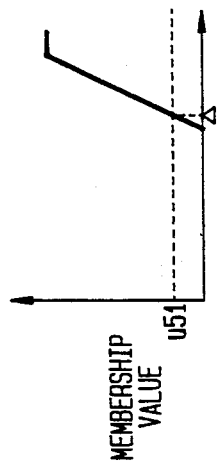

AUTOMATIC EXPOSURE ADJUSTING APPARATUS FOR AUTOMATICALLY ADJUSTING EXPOSURE BY FUZZY INFERENCE

BACKGROUND OF THE INVENTION

1. Field of the Invention

The present invention relates generally to automatic exposure adjusting apparatuses, and more particularly, to an automatic exposure adjusting apparatus contained in such an image sensing apparatus as a video camera for, when exposure is automatically adjusted based on a luminance evaluating value detected from a video signal obtained from an image sensor, subjecting a priority processing to the luminance evaluating value in accordance with a luminance distribution in an image sensed picture by fuzzy inference.

2. Description of the Background Art

Conventionally, an image sensing apparatus such as a video camera having an apparatus for automatically adjusting exposure or luminance level in response to a video signal obtained from an image sensor has been put into practice. As such conventional automatic exposure adjusting systems, there are two types of such systems, that is; a system of detecting such levels as a mean value and a peak value of a luminance level of a video signal obtained from an image sensor and mechanically adjusting an optical iris of a lens based on the detected levels and a system of electrically adjusting exposure by adjusting a gain of an amplifier for amplifying a level of a video signal obtained from an image sensor.

However, such a conventional automatic exposure adjusting apparatus has the following disadvantages. For example, when a high luminance portion such as a light source is included in a picture, a gain of the entire picture is decreased, so that a major object becomes insufficiently bright. On the contrary, when the background is very dark, the gain of the entire picture is increased, whereby the major object becomes too bright.

An exposure correcting method for eliminating such disadvantages has been proposed in, for example, Japanese Patent Laying-Open No. 62-110369. In this exposure correcting method, in view of the fact that a major object is arranged in the center of the picture in many cases, the picture is divided into a central region and a peripheral region, from each of which a luminance level of a video signal is detected as an evaluating value. Then, adjustment of the exposure is made based on a ratio of an evaluating value of the peripheral region to that of the central region to obtain an optimum exposure for the major object positioned in the central region of the picture.

FIG. 1 is a block diagram of an automatic exposure adjusting apparatus using such conventional method.

Light from an object, after passing through a lens 1 and having its amount adjusted by an optical iris mechanism 2, enters an image sensing circuit 3. The image sensing circuit 3 photoelectrically-converts the incident light and outputs the photoelectrically-converted light as a video signal.

The obtained video signal is amplified by a variable gain amplifier 4 to be sent to a not-shown video circuit and is also compared by a comparator 5 with a desired luminance level which will be described later. An iris motor 6 is driven in response to a difference voltage generated from the comparator 5, whereby the size of the aperture of the iris mechanism 2 is controlled.

The video signal outputted from the image sensing circuit 3 is also sent to a region selecting circuit 19, which circuit supplies a video signal in a priority region to an integrating circuit 20 comprising a digital integrator for detecting a level and supplies a video signal in a non-priority region to an integrating circuit 21 similarly comprising a digital integrator in response to a switching signal for separating regions obtained by a synchronization separating circuit 12 and a switching control circuit 18. Each of which integrating circuits 20 and 21 integrates one field of the supplied video signal.

Outputs of the integrating circuits 20 and 21 are applied to a dividing circuit 15, which circuit generates a signal corresponding to a ratio of both outputs and applies the signal to a gain controlling circuit 16 and a target luminance level controlling circuit 17. Both the controlling circuits 16 and 17 correct exposure by changing the gain of the variable gain amplifier 4 and a target luminance level of the optical iris based on the result obtained from the dividing circuit 15.

In such method of giving the central region a priority, a manner of setting a priority region is important. For example, if the priority region is set to be small, a luminance level of the priority region fluctuates greatly, so that if the exposure is corrected in response thereto, a luminance level of the entire picture greatly fluctuates. On the contrary, if the priority region is set to be large, while the luminance level of the entire picture becomes stable, the priority region includes not only the major object but also the background depending on the location, configuration of the major object and the like, whereby correction of the exposure is not sufficiently made.

One solution to this problem is to subdivide the priority region and make a priority of each region variable to perform a fine priority processing corresponding to various pictures. However, an image sensed picture has various luminance distributions in practice, so that it is difficult to set a value by classifying all the cases based on numerical conditions because of strict restrictions of a capacity of the system and processing capability.

In addition, in case such an extremely high luminance object as a light source is included in the priority region or it occupies a large area of the picture, fixing the priority region at the center of the picture as the above-described conventional art allows neighboring major objects to become dark due to a reverse effect of the correction or a lack of the amount of the correction.

Generally, in a picture of a low luminance such as at night or in a dark room, a difference in luminance levels between the regions mainly depends on a reflection factor of the object itself such as black and white rather than the brightness. If the same correction is made to such a picture as that is made to the image sensed picture having a large difference in brightness outdoors as the above-described conventional art, unnecessarily intensive correction is made for the difference in the reflection factor of the object itself such as black or white, so that a unnatural picture is produced.

On the other hand, in the automatic exposure adjusting apparatus shown in FIG. 1, a ratio of the output of the integrator 20 to that of the integrator 21 becomes 1:3 in a rear light state, that is, in a state wherein the light source is included in the non-priority region, a luminance level of the priority region is, for example, ⅓ times that of the non-priority region and the areas of both the regions are the same, so that an optimum brightness can be obtained for the object in the priority region by setting a target luminance level to be higher than usual.

Such conventional technique is effective for correcting exposure in a so-called rear light state wherein an abnormally high luminance portion such as a light source is included in the non-priority region, making the background in the non-priority region remarkably brighter than the major object in the priority region, the technique might adversely affect the picture in a so-called excessive follow light state wherein the major object is remarkably brighter than the background. Namely, generally in the excessive follow light state, if the luminance level is corrected to the same level as in the rear light state, the peripheral portion of the picture wherein the background exists becomes dark to make the picture have an impression different from that received from the actual scene.

The solution to these problems is proposed and described in the copending U.S. patent application Ser. No. 294,866 filed on the Jan. 9, 1989 and assigned to the same assignee of the instant application.

The first of these solutions is computing a luminance evaluating value indicating a luminance level of each region by dividing an image sensed picture into a plurality of regions in advance, extracting a video signal in each region and integrating one field of a low frequency component of the signal. Then, the luminance evaluating value of each region is compared with a reference value which is expected to be obtained when such an abnormal luminance portion as a light source is included in the region and a determination is made that a region having a luminance evaluating value exceeding the reference value includes an abnormal luminance portion. Then, by controlling exposure such that a mean value of the luminance evaluating values in the regions excluding the region including the abnormal luminance portion coincides with the target value, the influence of the abnormal luminance portion on the entire image sensed picture is eliminated, so that an optimum exposure for the object in the regions without the abnormal luminance portion is obtained.

The second solution is designating as a priority region a central region of the picture expected to have a particularly high probability of including the major object among the above-described plurality of regions, weighting a luminance level of the priority region and then computing an average luminance evaluating value (representative value) with respect to all regions. Then, by controlling exposure so as to make the representative value coincide with the target value, an optimum exposure for the major object can be obtained.

The third solution, while in a normal state of picture taking the above-described second solution is carried out, is always monitoring the luminance level of each region becoming remarkably high or low, that is, an abnormally high luminance portion or an abnormally low luminance portion being included in any of the regions, so that if there is a region including the abnormal luminance portion, a luminance level of this region is prevented from affecting the computation of the above-described representative value, thereby preventing the effect of such abnormal luminance portion as a light source on the entire picture.

Furthermore, the fourth counter measure is, in the normal state of taking picture, giving a central region of the picture a priority as a major region over the other regions to adjust exposure such that a luminance level of the major region becomes an optimum level and when the major region includes such an abnormally high luminance portion as a light source or such an abnormally low luminance portion as dark green, controlling exposure such that an average luminance level of the other regions except for the major region becomes an optimum level.

As the above-described first counter measure, it is very effective for taking picture in a rear light or an excessive follow light state to divide the image sensed picture and detect the existence of an abnormal luminance portion or a location of the same on the picture, that is, detect a so-called luminance distribution in the image sensed picture and make the adjustment of exposure corresponding to the detection result.

However, it is impossible to distinguish a state wherein a luminance evaluating value slightly exceeds the reference value from a state wherein it largely exceeds the same by a method of simply dividing the cases depending on whether the luminance evaluating value exceeds the reference value or not in detecting a luminance distribution as the first method. Accordingly, for example, in case a luminance evaluating value of the region including the abnormal luminance portion is approximately equal to the reference value, the luminance evaluating value becomes higher than the reference value at some time points and becomes lower at other time points, so that exposure controlling is made every time, of holding the regions without the abnormal luminance portion in an optimum exposure state with the influence of the abnormal luminance portion being disregarded and holding only the region including the abnormal luminance portion in an optimum exposure state responsive to the influence of the abnormal luminance portion, whereby the brightness of the entire picture intermittently varies in response thereto to make the picture unsightly.

In addition, if the light source which is of a low luminance in the initial state gradually becomes a high luminance, a luminance evaluating value of the region including the light source in due course exceeds the reference value. Then, since the effect of the light source on the adjustment of exposure largely varies immediately before and after the luminance evaluating value exceeds the reference value, the brightness of the image sensed picture (the region without the light source) abruptly changes from dark to bright at the turning point at which the luminance evaluating value exceeds the reference value, resulting in a unsightly picture.

Now, considered is a case wherein the picture is divided into six regions of A1 through A6 as shown in FIG. 3 and the central regions A1 and A2 are considered to be priority regions in the above-described second counter measure. In this case, assuming that a light source such as sun enters the region A2 in taking a picture and a major object S is located in the regions A1 and A3 as indicated by the oblique lines as in FIG. 5, the major object S is in a rear light state, so that luminance levels of the regions A1 and A3 become approximately the same low levels and a luminance level of the region A2 becomes extremely high.

Under such circumferences, if the priority regions A1 and A2 are weighted as described above, the representative value of the picture becomes high due to the influence of the luminance level of the region A2. Accordingly, if exposure is adjusted based on these luminance levels, the major object becomes extremely lacking in exposure.

On the contrary, if such an abnormally low luminance portion as dark green enters the region A2, the major object is extremely oversupplied with exposure.

Now, while the above-described third countermeasure is very effective in a rear light or an excessive follow light state, the following problems arise in intentionally taking a picture of such an abnormal luminance portion as a light source. Namely, considering, for example, a case wherein a light source is taken picture of the image sensing apparatus is logically fixed to a position such that the light source is situated in a major region at the center of the picture. On this occasion, since a luminance level of the major region becomes remarkably high, it can not concern the calculation of a representative value, so that exposure is adjusted such that the regions excluding the major region enter an optimum exposure state. As a result, the major region becomes highly luminant to make taking a picture of the light source itself difficult.

In the above-described fourth countermeasure, in a normal picture taking, a region wherein the major object is highly probably included is designated as the central region of the picture and the other regions are uniformly designated as regions wherein the major object is less probably included. However, in actually taking a picture, the other regions than the central region of the picture slightly differ in probability of the existence of the major object, so that the above-described fourth countermeasure has a problem that a fine adjustment of exposure can not be made corresponding to these subtle differences.

SUMMARY OF THE INVENTION

Therefore, one object of the present invention is to make a fine and natural automatic adjustment of exposure in accordance with various luminance distributions produced on the actual picture.

Another object of the present invention is to make an optimum automatic adjustment of exposure corresponding to a configuration or a location of a major object.

A further object of the present invention is to enable a smooth automatic adjustment of exposure without a sudden change of the brightness of an image sensed picture in accordance with a luminance distribution.

Still another object of present invention is to provide an automatic exposure adjusting apparatus preventing unnecessary correction of exposure by limiting priority processing of a particular region in a low luminance state.

A still further object of the present invention is to provide an automatic exposure adjusting apparatus capable of obtaining an optimum exposure regardless of a size and a location of a high luminance portion and the like by decreasing a priority of a high luminance region in a high luminance state.

A still further object of the present invention is to provide an automatic exposure adjusting apparatus capable of successively obtaining a natural picture corresponding to the changes of a size and intensity of an abnormal luminance portion.

A still further object of the present invention is to provide an exposure adjusting apparatus capable of excellently correcting exposure regardless of a location or a configuration of a major object even if in a rear light or excessive follow light state.

A still further object of the present invention is to provide an automatic exposure adjusting apparatus capable of maintaining an optimum exposure state of an abnormal luminance portion even if the abnormal luminance portion is selected as a major object.

A still further object of the present invention is to provide an automatic exposure adjusting apparatus which limits an excessive correction of exposure for a picture in an excessive follow light state and prevents the picture from becoming dark.

Briefly stated, the present invention is an automatic exposure adjusting apparatus having a few rules previously set in order to determine priority of each region of a picture in accordance with a luminance distribution of the picture and using fuzzy inference in determining a priority based on these rules.

According to another aspect of the present invention, detection of a luminance distribution of an image sensed picture is performed by using fuzzy inference having as an input variable a ratio of luminance evaluating values of arbitrary two regions out of a plurality of regions obtained by dividing the image sensed picture.

According to a further aspect of the present invention, low luminance of a picture is detected by a luminance level of the picture or the size of an aperture of the diaphragm or the like, and a priority processing for giving a particular region a priority in response to a change of the luminance level of the picture is limited.

According to a still further aspect of the present invention, when an object of the high luminance is included in a picture, it is detected and evaluating a luminance of the picture is made not by a normal priority processing but by giving a low luminance region a priority.

According to a still further aspect of the present invention, in a rear light state or an excessive follow light state, higher priorities are given to a plurality of regions each having an approximately equal luminance evaluating value.

According to a still further aspect of the present invention, a priority region at the center of a picture is further subdivided into central and peripheral regions, so that a region without an abnormal luminance portion out of the subdivided regions is given priority for the adjustment of exposure.

According to a still further aspect of the present invention, if any of the regions of an image sensed picture includes an abnormal luminance portion, the amount of weighting of a major region is increased as compared with the other regions to enhance the effect of the major region on the calculation of a representative value.

According to a still further aspect of the present invention, in case a luminance level of a priority region and that of a non-priority region are compared with each other, and a determination is made that the priority region is in a follow light state, a priority processing is limited which gives the luminance level of the priority region a priority over that of the non-priority region.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flow chart showing an automatic exposure adjusting operation according to the present invention.

FIGS. 9(a) and 9(b) are graphs showing a membership functions of rule 3 according to the first embodiment of the present invention.

FIG. 14 is a block diagram showing one example of an automatic exposure adjusting apparatus implementing the rule 5' shown in FIG. 13.

FIGS. 15(a)-15(c) are graphs showing a membership functions of rule 4 according to a second embodiment of the present invention.

FIGS. 16(a)-16(c) are graphs showing a membership functions of rule 5 according to the second embodiment of the present invention.

FIGS. 17(a)-17(c) are graphs showing a membership functions of rule 6 according to the second embodiment of the present invention.

DESCRIPTION OF THE PREFERRED EMBODIMENTS

Figure 1:
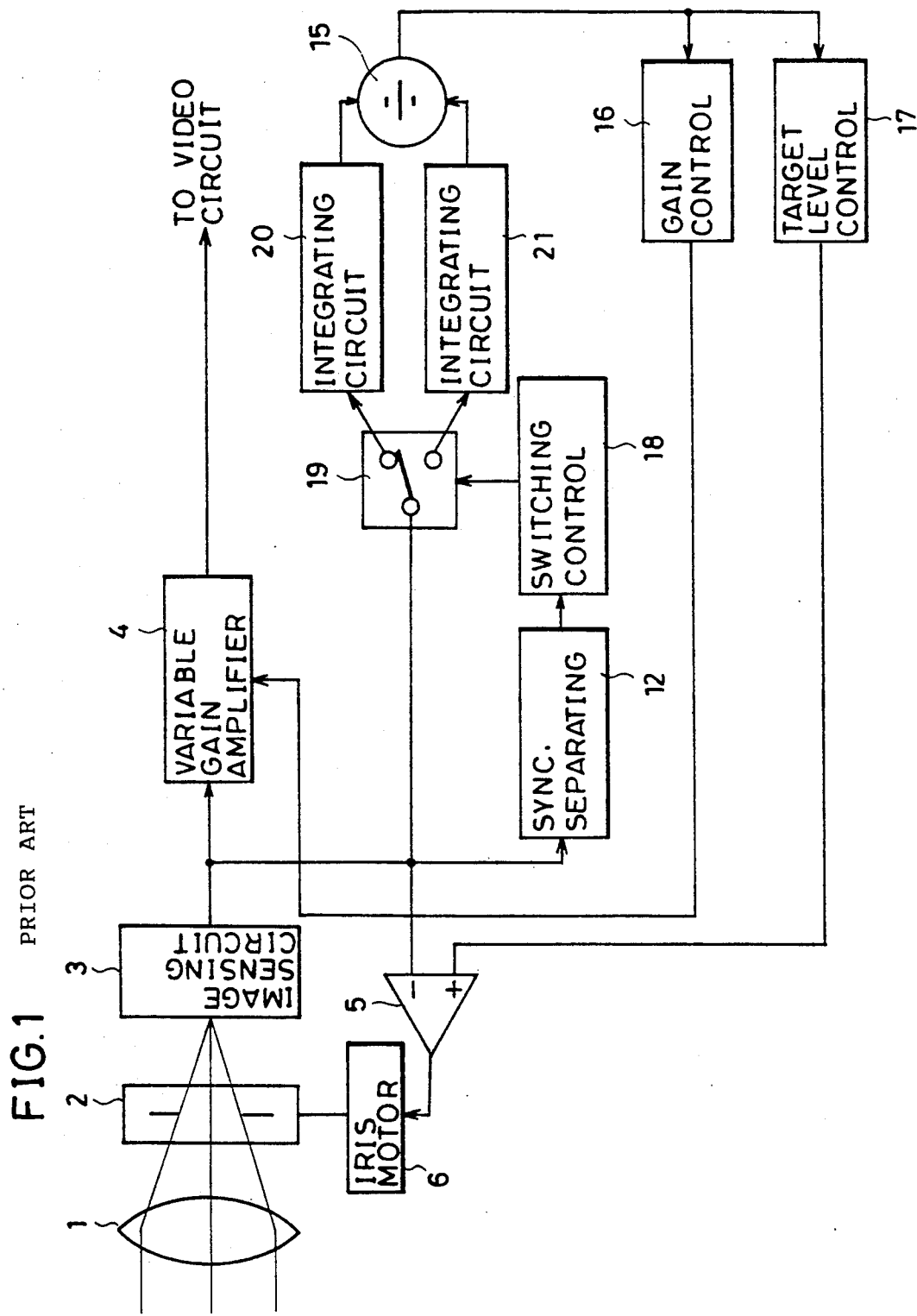
FIG. 1 is a block diagram showing a conventional automatic exposure adjusting apparatus.
Figure 2:
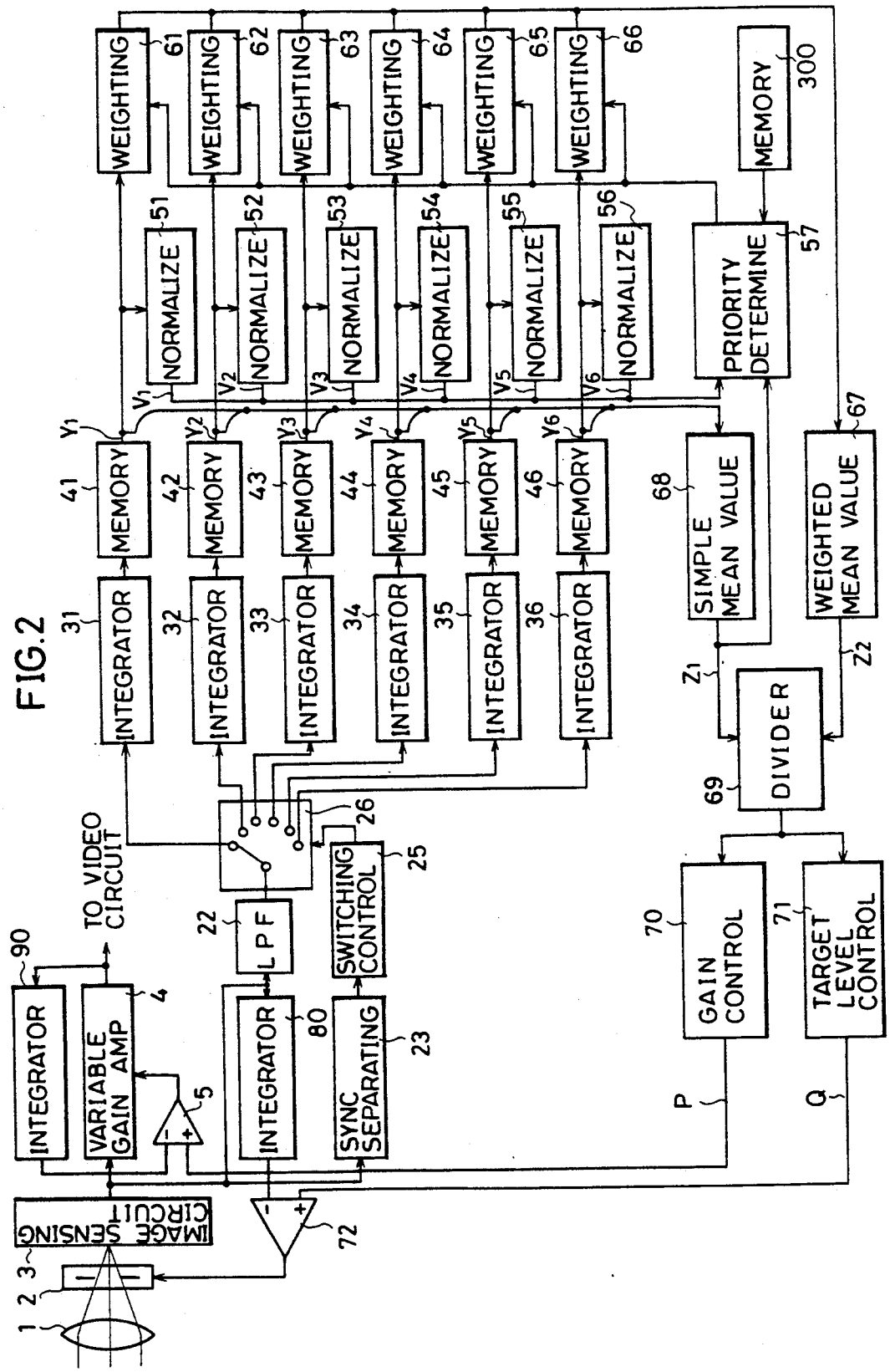
FIG. 2 is a block diagram showing an automatic exposure adjusting apparatus according to one embodiment of the present invention.

FIG. 2 is a block diagram showing an automatic exposure adjusting apparatus according to one embodiment of the present invention.

In FIG. 2, incident light from an object, after passing through a lens 1 and having its amount adjusted by an optical iris mechanism 2, enters an image sensing circuit 3. The image sensing circuit 3 photoelectrically-converts the incident light and outputs the photoelectrically-converted light as a video signal obtained from an image sensor.

The obtained video signal is sent to a not-shown video circuit after being amplified by a variable gain amplifier 4 and is also applied to a low pass filter (LPF) 22, a synchronization separating circuit 23 and an integrator 80.

The LPF 22 extracts a low frequency component of a luminance signal in the video signal obtained from the image sensor and applies the same to a switching circuit 26 in a succeeding stage.

The synchronization separating circuit 23 extracts vertical and horizontal synchronizing signals from the video signal and applies the same to a switching control circuit 25 in the succeeding stage. The switching control circuit 25 generates a switching signal for dividing a picture into six regions of A1 through A6 shown in FIG. 3 based on the vertical and horizontal synchronizing signals and an output of an oscillator (not shown) of a fixed frequency for use in driving a CCD (not shown) of image sensing circuit 3 and applies the same to the switching circuit 26.

In response to the switching signal, the switching circuit 26 is sequentially switched corresponding to the selection of the regions A1 through A6 and an output of the LPF 22 is time-shared by each region by the switching circuit 26 and the time-shared outputs are applied to the corresponding integrating circuit 31 through 36.

Figure 4:
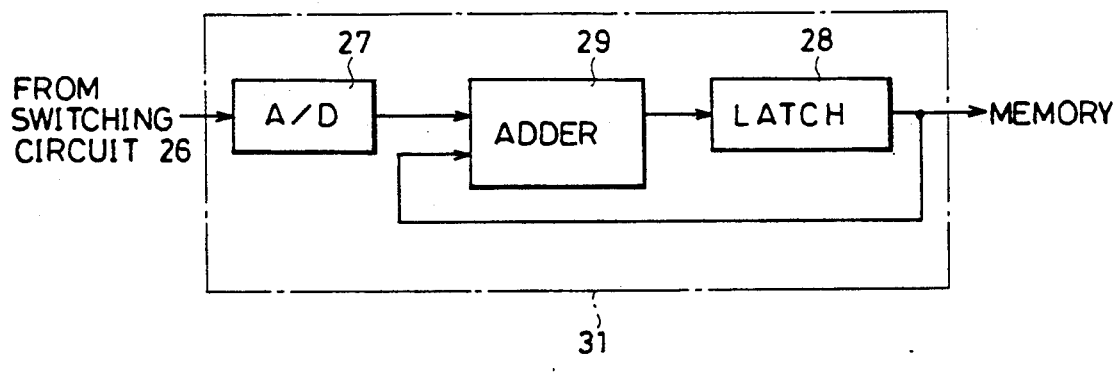
FIG. 4 is a block diagram showing an integrating circuit of FIG. 2 in detail.

Each of the integrating circuits 31 through 36 is a digital integrator comprising an A/D converter 27 for A/D converting an output of the switching circuit 26, an adder 29 for adding the A/D converted output and an output of a latch circuit 28 in the succeeding stage, and a latch circuit 28 for latching the addition output, all as shown in FIG. 4. In the digital integrator, a low frequency component of a luminance signal in the corresponding region is A/D converted in a predetermined sampling cycle and the A/D converted data is integrated during one field.

As a result, the integrating circuit 31 applies an integration value of one field of the low frequency component of the luminance signal in the region A1 to a memory 41, and in the same manner, integration values of one field of luminance signals in the regions A2, A3, A4, A5 and A6 are applied from the integrating circuits 32, 33, 34, 35 and 36 to memories 42, 43, 44, 45 and 46, respectively. The latch circuit 28 of FIG. 4 is reset every field and each of the memories 41 through 46 of FIG. 2 holds data immediately before being reset in the corresponding latch circuit, which data being updated every field.

Figure 3:
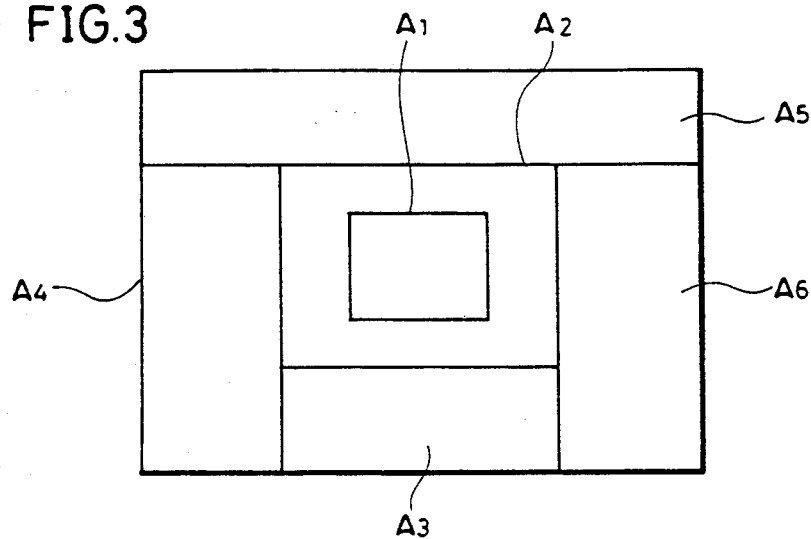
FIG. 3 is a diagram showing a manner of setting regions on a picture.

Referring to FIG. 3, the regions A1 through A6 have areas S1 through S6, respectively, and the region A1 is located at the center of the picture and the region A2 is located at the periphery of the region A1 as shown in FIG. 3. The regions A3 through A6 are further arranged around the region A2.

When the integration of the data of one picture, that is, of one field, by the integrating circuits is finished, integration values of the latest fields of the respective regions respectively stored in the memories 41 through 46 are applied to a simple mean value circuit 68 in the succeeding state as luminance evaluating values Y1 through Y6 of the respective regions and are also applied to the corresponding normalizing circuits 51 through 56 and weighting circuits 61 through 66.

The normalizing circuits 51 through 56 divide the luminance evaluating values Y1 through Y6 of the respective regions by the respective areas S1 through S6 to obtain a luminance evaluating value per unit area of each region and outputs the same as normalized luminance evaluating values V1 through V6 (V1=Y1/S1, V2 =Y2/S2, ... ). Although the normalized luminance evaluating values V1 through V6 are actually supplied to a priority determining circuit 57 in parallel, for the convenience of illustration, they are illustrated to be transmitted through a common line.

The priority determining circuit 57 determines priority (weight) of each region based on each of the normalized luminance evaluating values V1 through V6. A priority determining process by the priority determining circuit 57 is shown in the flow chart of FIG. 6, and the process employs so-called fuzzy inference for dealing with information having fuzzy boundaries. The fuzzy inference employs the following rules.

Rule 1

"If V1 and V2 are close to each other and V1 and V3 are not close to each other, then regions A1 and A2 are given priority".

Rule 2

"If V1 and V2 are not close to each other and V1 and V3 are close to each other, then regions A1 and A3 are given priority".

Rule 3

"If V1 and V2 are not close to each other and V1 and V3 are not close to each other, then the region A1 is given a priority".

Rule 4

"If V1 and V2 are close to each other and V1 and V3 are close to each other, then the regions A1, A2 and A3 are given priority".

Rule 5

"If max (Vi) (i=1−6) is small, then all the regions are given the same priority".

Rule 6

"If max (Vi) is not small and a simple mean value is small, then a region having a value smaller than the simple mean value is given a priority".

As shown in FIGS. 7 through 12, these rules have conditions such as "close" and "small" defined by such membership functions as "V2/V1" and "max (Vi)" for each input variable and have priorities (wik) of the respective regions as a conclusion portion. The inference is performed by using a conventional min-max method.

Now, each of the respective rules will be described in detail.

Figure 7A:
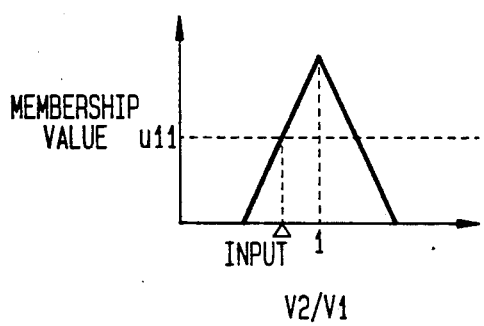
FIGS. 7(a) and 7(b) are graphs showing membership functions of rule 1 according to a first embodiment of the present invention.
Figure 7B:
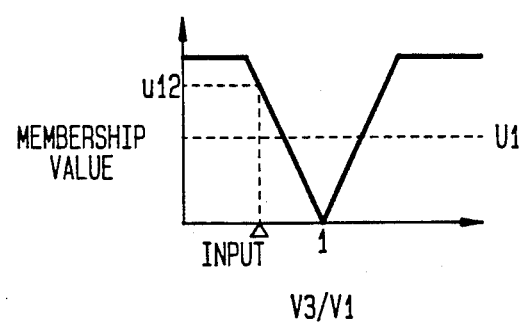
Figure 7B:
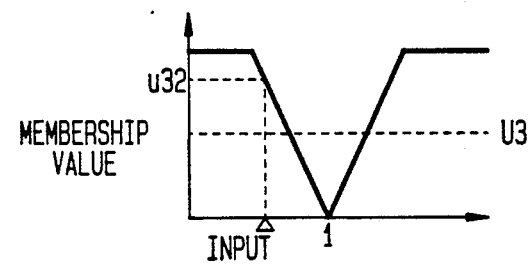

Rule 1 is defined by the membership functions as shown in FIGS. 7 (a) and (b). FIG. 7 (a) shows the membership function with respect to the input variable V2/V1 indicating the degree that the first condition of the rule 1 "V1 and V2 are close to each other" is satisfied. More specifically, in order to determine the degree of the closeness between the normalized luminance evaluating value V1 of the region A1 and the normalized luminance evaluating value V2 of the region A2, a membership value $u_{11}$ is obtained by substituting the input variable V2/V1 at the latest field in the chevron-shaped membership function with an input variable of V2/V1 and having the maximum value at V2/V1=1. The membership value $u_{11}$ attains its maximum at V2/V1=1.

FIG. 7(b) shows a membership function with respect to an input variable V3/V1 indicating the degree that the second condition of the Rule 1 "V1 and V3 are not close to each other" is satisfied. More specifically, in order to determine how much the normalized luminance evaluating value V1 of the region A1 and the normalized luminance evaluating value V3 of the region A3 are not close to each other, a membership value $u_{12}$ is obtained by substituting the input value V3/V1 in the latest field in the V-shaped membership function with an input variable of V3/V1 and having the minimum value at V3/V1=1. The membership value $u_{12}$ attains its minimum when V3/V1=1. As the foregoing, the membership values $u_{11}$ and $u_{12}$ for the first and second conditions of the rule 1 are calculated as shown in FIGS. 7 (a) and 7(b). The calculation corresponds to the step 100 of the flow chart of FIG. 6.

In step 101, among the above-described membership values $u_{11}$ and $u_{12}$ the minimum value, that is, a smaller membership value, is selected as U1, the degree that the rule 1 is satisfied, for an AND processing of both values. In case of FIG. 7, since $u_{11} < u_{12}$, then it is set that U1 $= u_{11}$.

The operations in the above-described steps 100 and 101 are performed with respect to the other five rules.

Figure 8A:
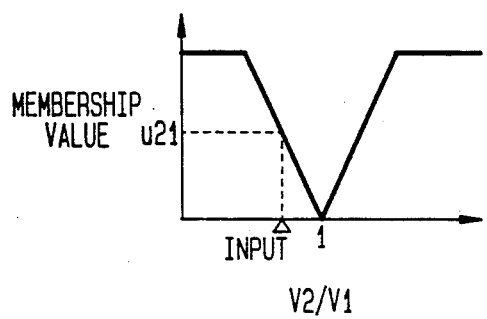
FIGS. 8(a) and 8(b) are graphs showing a membership functions of rule 2 according to the first embodiment of the present invention.
Figure 8B:
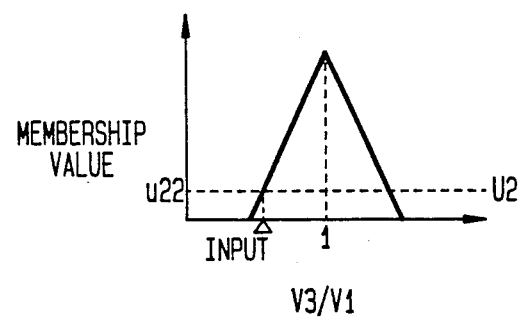

Rule 2 is defined by V-shaped and chevron-shaped membership functions as those of FIGS. 8 (a) and 8(b). Then, similarly in case of FIGS. 7(a) and 7(b), a membership value $u_{21}$ for the first condition of the rule 2, "V1 and V2 are not close to each other", is obtained from the membership function shown in FIG. 8(a) and a membership value $u_{22}$ for the second condition of the rule 2, "V1 and V3 are close to each other", is obtained from the membership function shown in FIG. 8(b), so that in step 101 the smaller one of the membership values $u_{21}$ and $u_{22}$ is selected as U2, the degree that the rule 2 is satisfied. In case of FIG. 8(a) and 8(b), since $u_{21} > u_{22}$, then it is set that U2$=u_{22}$.

Figure 9A:
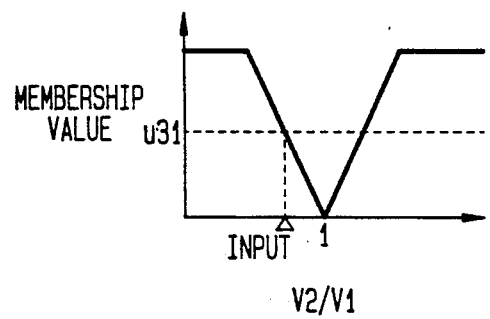

Rule 3 is defined by V-shaped membership functions as shown in FIGS. 9 (a) and 9 (b). Then, similarly in FIGS. 7(a) and 7(b) a membership value $u_{31}$ for the first condition of the rule 3, "V1 and V2 are not close to each other", is obtained from the membership function shown in FIG. 9(b) and a membership value $u_{32}$ for the second condition of the rule 3, "V1 and V2 are not near to each other", is obtained from the membership function shown in FIG. 9(b), so that in step 101 the smaller one of the membership values $u_{31}$ and $u_{32}$ is selected as U3, the degree that the rule 3 is satisfied. In case of FIGS. 9(a) and 9(b), since $u_{31} < u_{32}$, then it is set that U3$=u_{31}$.

Figure 10A:
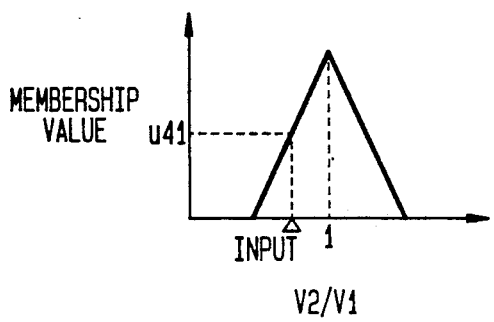
FIGS. 10(a) and 10(b) are graphs showing a membership functions of rule 4 according to the first embodiment of the present invention.
Figure 10B:
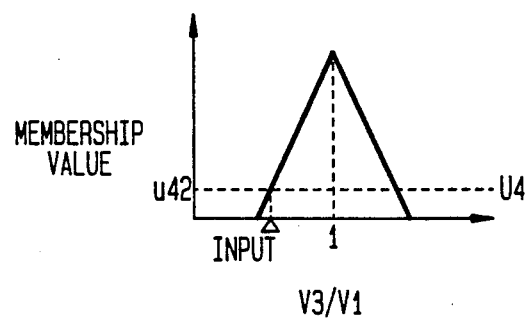
Figure 11:
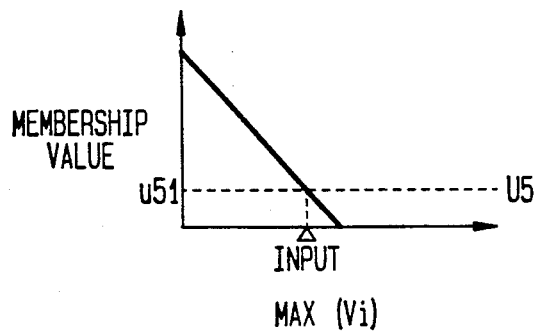
FIG. 11 is a graph showing a membership function of rule 5 according to the first embodiment of the present invention.

Rule 4 is defined by chevron-shaped membership functions as shown in FIGS. 10 (a) and 10 (b). Then, a membership value $u_{41}$ for the first condition of the rule 4, "V1 and V2 are close to each other", is obtained from the membership function shown in FIG. 10(b) and a membership value $u_{42}$ for the second condition of the rule 4, "V1 and V3 are close to each other", is obtained from the membership function shown in FIG. 10(b) so that in step 101 the smaller one of the membership values $u_{41}$ and $u_{42}$ is selected as U4, the degree that the rule 4 is satisfied. In case of FIGS. 10(a) and 10(b) since $u_{41} > u_{42}$, then it is set that U4$=u_{42}$.

Rule 5 is defined by a membership function shown by a simple decreasing line indicating the degree of smallness of a maximum value max (Vi) (wherein i=1−6), with a maximum value max (Vi) of each of all the normalized luminance evaluating values V1 through V6 as an input value. Then, determination of the max (Vi) unconditionally settles a membership value $u_{51}$, which value becomes smaller as the max (Vi) becomes larger.

Since in step 101 there is only one membership value with respect to the rule 5, U5 is set to be equal to $u_{51}$ after the rule 5 is satisfied.

Figure 12A:
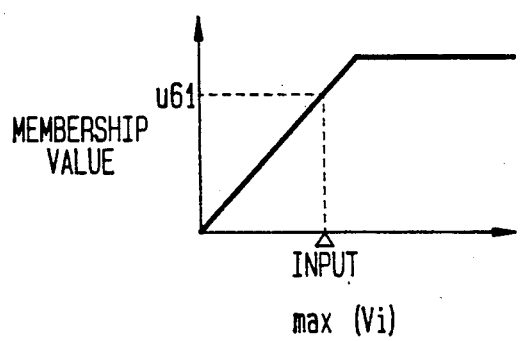
FIGS. 12(a) and 12(b) are graphs showing a membership functions of rule 6 according to the first embodiment of the present invention.
Figure 12B:
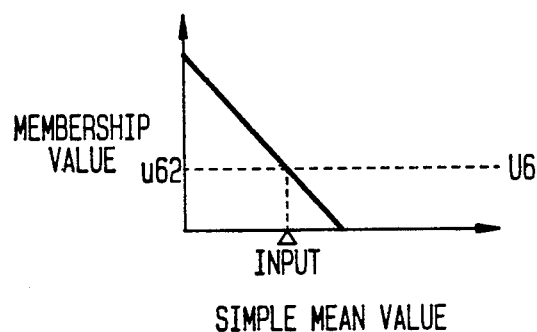

Rule 6 is defined by a membership function having a simple increasing line with a max (Vi) as an input variable similar to that for the rule 5 and by a membership function having a simple decreasing line with a simple mean value $Z_1$ $$\left( Z_1 = \sum_{i=1}^{6} Y_i / \sum_{i=1}^{6} S_i \right)$$

of all the normalized luminance evaluating values V1 through V6 as an input variable, as shown FIGS. 12 (a) and 12 (b). More specifically, in the membership function of FIG. 12 (a), if the max (Vi) is selected as an input variable in order to determine the degree of non-smallness max (Vi) under the first condition of the rule 6 that "max (Vi) is not small", a membership value $u_{61}$ can be selected. The membership value $u_{61}$ becomes smaller as the max (Vi) becomes smaller. In addition, in the membership function of FIG. 12 (b), if a simple mean value is selected as an input variable in order to determine the degree of the smallness of the above-described simple mean value Z1 under the second condition of the rule 6 that "simple mean value is small", a membership value $u_{62}$ can be determined. The membership value $u_{62}$ becomes smaller as the simple mean value becomes larger. In step 101, the smaller one of the membership values $u_{61}$ and $u_{62}$ is selected and U6 is set to be equal to $u_{62}$ after the rule 6 is satisfied.

As the foregoing, after it is determined in step 102 that in steps 100 and 101 calculation is completed of each degree Ui (i=1−6) that each of all the rules is satisfied, a priority Wk (k=1−6) for each region is calculated in step 103. The priority Wk is calculated by weighting a means value of the conclusion portion with each degree that each rule is satisfied, as expressed by the following equation.

$$W_k = \sum_{i=1}^{6} U_i \cdot w_{ik} / \sum_{i=1}^{6} U_i \quad (k = 1\text{-}6) \tag{A}$$

In the equation (A), $w_{ik}$ is the priority in each region for each rule and is individually set for each rule.

For example, with respect to the rule 1, in order to numerically show "the regions A1 and A2 are given priorities" as a conclusion portion, all priorities $w_{11}$ through $w_{16}$ of the regions A1 through A6 are set as follows in advance:

$w_{11} = w_{12} = 3$ $w_{13} = w_{14} = w_{15} = w_{16} = 1$

Namely, with respect to the rule 1, the regions A1 and A2 are given priorities three times higher than the other regions. Determination of the priorities is based on the previously performed experiments.

With respect to the rule 2, in order to show "the region A1 and A3 are given priorities" as a conclusion portion, the priorities $W_{21}$ through $W_{26}$ of the respective regions are previously set as follows.

$w_{21} = w_{23} = 3$ $w_{22} = w_{24} = w_{25} = w_{26} = 1$

With respect to the rule 3, in order to show "the region A1 is given priority" as a conclusion portion, priorities $W_{31}$ through $W_{36}$ of the respective regions are previously set at follows.

$w_{31} = 3$ $w_{32} = w_{33} = w_{34} = w_{35} = w_{36} = 1$

With respect to the rule 4, in order to show "the regions A1, A2 and A3 are given priorities" as a conclusion portion, priorities $w_{41}$ through $w_{46}$ of the respective regions are previously set as follows.

$w_{41} = w_{42} = w_{43} = 3$ $w_{44} = w_{45} = w_{46} = 1$

With respect to the rule 5, in order to show "all the regions are given the same priority" as a conclusion portion, priorities $w_{51}$ through $w_{56}$ of the respective regions are previously set as follows.

$w_{51} = w_{52} = w_{53} = w_{54} = w_{55} = w_{56} = 1$

With respect to the rule 6, in order to show "regions having values smaller than the simple mean value are given priorities" as a conclusion portion, priorities $w_{61}$ to $w_{66}$ of the respective regions are set as follows.

If $V_l \leq$ simple mean value $Z_1$, then $w_6l = 3$, and if $V_l >$ simple mean value $Z_1$, then $w_6l = 1$ wherein $l = 1 - 6$.

For example, in case the normalized luminance evaluating values V1 through V3 of the regions A1 through A3 are larger than the simple mean value $Z_1$, the following equation can be obtained.

$w_{64} = w_{65} = w_{66} = 3$ $w_{61} = w_{62} = w_{63} = 1$

The simple mean value Z1 is calculated by a simple mean value circuit 68 as will be described later.

Now taking FIGS. 7 through 12 as examples, description will be made of a priority Wk taking all the rules into consideration by using priorities of respective regions in each rule.

In this case, with respect to the region A1, the equation (A) is made into the following equation (B).

$$W_1 = \sum_{i=1}^{6} U_i \cdot w_{i1} / \sum_{i=1}^{6} U_i \tag{B}$$

In the equation (B), since $$\sum_{i=1}^{6} U_i \cdot w_{i1} = U_1 \cdot w_{11} + U_2 \cdot w_{21} + \ldots + U_6 \cdot w_{61}$$

$$= u_{11} \cdot 3 + u_{22} \cdot 3 + u_{31} \cdot 3 +$$

$$u_{42} \cdot 3 + u_{51} \cdot 1 + u_{62} \cdot 1$$

$$\sum_{i=1}^{6} U_i = U_1 + U_2 + U_3 + U_4 + U_5 + U_6$$

$$= u_{11} + u_{22} + u_{31} + u_{42} + u_{51} + u_{62}$$

the priority $W_1$ of the region A1 will be expressed as the following equation.

$$W_1 = (3u_{11} + 3u_{22} + 3u_{31} + 3u_{42} + u_{51} + u_{62})/(u_{11} + u_{22} + u_{31} + u_{42} + u_{51} + u_{62})$$

Similarly, the priorities $W_2$ through $W_6$ are respectively calculated as follows.

$$W_2 = (3u_{11} + u_{22} + u_{31} + 3u_{42} + u_{51} + u_{62})/\sum_{i=1}^{6} U_i$$

$$W_3 = (u_{11} + 3u_{22} + u_{31} + 3u_{42} + u_{51} + u_{62})/\sum_{i=1}^{6} U_i$$

$$W_4 = (u_{11} + u_{22} + u_{31} + u_{42} + u_{51} + 3u_{62})/\sum_{i=1}^{6} U_i$$

$$W_5 = (u_{11} + u_{22} + u_{31} + 3u_{42} + u_{51} + 3u_{62})/\sum_{i=1}^{6} U_i$$

$$W_6 = (u_{11} + u_{22} + u_{31} + 3u_{42} + u_{51} + 3u_{62})/\sum_{i=1}^{6} U_i$$

The priority $W_k$ of each region thus determined by the fuzzy inference for all the rules is applied to the weighting circuits 61 through 66 in parallel. The weighting circuits 61 through 66 weight luminance evaluating values with the priorities $W_1$ through $W_6$ of the respective regions, to perform a so-called priority processing.

More specifically, the priorities W1 through W6 of the regions corresponding to the respective luminance evaluating values Y1 through Y6 are multiplied to compute $Y_i \cdot W_i$ ($i = 1-6$). All of these weighted luminance evaluating values are applied to a weighted means value circuit 67 in parallel. The weighted mean value circuit 67 divides the addition value of the outputs of the weighting circuits 61 through 66 by a sum of products of the respective priorities and areas and outputs a weighted mean value $Z_2$, namely, it is calculated as follows:

$$Z_2 = \sum_{i=1}^{6} W_i \cdot Y_i / \sum_{i=1}^{6} W_i \cdot S_i \quad (C)$$

wherein $S_i$ ($i = 1-6$) denotes an area of each region.

The simple mean value circuit 68 adds all the luminance evaluating values $Y_i$ and divides the addition value by the area of the entire picture $S_1 + S_2 \ldots + S_6$ and obtains a simple mean value $Z_1$ of the entire picture, that is, $$Z_1 \text{ equals } \sum_{i=1}^{6} Y_i / \sum_{i=1}^{6} S_i.$$

The simple mean value $Z_1$ is the same value as that obtained by weighting the respective luminance evaluating values $Y_i$ with the priorities $w_1$ through $w_6$ all being "1" by the weighting circuits 61 through 66 and carrying out the calculation of the equation (C) by the weighted mean value circuit 67.

The simple mean value $Z_1$ and the weighted mean value $Z_2$ calculated as the foregoing are inputted to a divider 69 wherein division of $m = Z_1/Z_2$ is carried out. Then, the result, m, is inputted to a gain controlled circuit 70 and a target level controlling circuit 71.

The gain controlled circuit 70 is for supplying a target level P to a comparator 5 for controlling a gain of the variable gain amplifier 4. The target level P is set to an optimum target level $P_0$ at which an optimum exposure can be obtained in an image sensed picture, when $m = 1$, that is, when the simple mean value $Z_1$ and the weighted means value $Z_2$ are equal, and accordingly, a luminance distribution of the image sense picture is not considered. Then, the target value P follows the above-described division value m as a correction value such that the equation $P = mP_0$ is always satisfied. Accordingly, it results in the change of the target level P such that the weighted mean value $Z_2$ attains the optimum target level $P_0$ by the adjustment of exposure.

The comparator 5 is, by integrating a video signal with a sufficiently large time constant (for example one field period), for comparing an output of an integrator 90 indicating a luminance level of the corresponding field with the target level P, supplying the comparison output to the variable gain amplifier 4 and controlling a gain that the integration output coincides with the target level P. As a result, the video signal is subjected to AGC with the weighting processing considered.

A target level controlling circuit 71 is for supplying a target level Q to a comparator 72 for controlling the target of the aperture of the diaphragm of the optical iris. The target level Q is set to an optimum target level of $Q = q_0$ when the division value $m = 1$ is satisfied, similarly to the case of the above-described target level P. Then, the target level Q fluctuates such that the equation $Q = mq_0$ is always satisfied between Q and the division value m and consequently the weighted mean value $Z_2$ always coincides with the optimum target level $q_0$ by the adjustment of exposure.

The comparator 72 is for comparing the above-described target level Q with an output of the integrator 80 and supplies the comparison output to the iris mechanism 2. The size of aperture of the optical iris mechanism 2 is controlled such that the integration output indicating a luminance level of the corresponding field coincides with the target level Q by driving the iris mechanism 2 based on this comparison output. The time constant of the integrator 80 is set such that it equals that of the integrator 90 and the optical iris mechanism 2 does not follow an instantaneous change of the video signal obtained from the image sensor.

Since the target levels P and Q of the comparators 5 and 72 respectively controlling drives of the variable gain amplifier 4 and optical iris mechanism 2 change corresponding to the weighted mean value $Z_2$, the weighting processing is fully reflected in the electrical adjustment of exposure by the variable gain amplifier 4 and the optical adjustment of exposure by the iris mechanism 2. For example, in case the simple mean value $Z_1$ of the entire picture is "120" and the mean value $Z_2$ is "100", it can be seen that while a sufficient brightness is obtained in view of the entire picture, it is not so only in view of the priority regions based on the rules 1 to 6, so that the central region is dark. As a result, the division value m attains 1.2 and the target levels P and Q respectively rise to $mP_0$ and $mQ_0$, and accordingly, the gain of the variable gain amplifier 4 rises and the size of the aperture of the iris mechanism 2 becomes larger. Accordingly, an optimum adjustment of exposure is made for the priority regions.

Now, description will be given for each rule on how the rules 1 through 6 influence the adjustment of exposure. The rules 1 to 4 are bases of the priority processing and, when the regions A1, A2 and A3 have luminance evaluating values close to one another, function to give these regions priorities.

Figure 5:
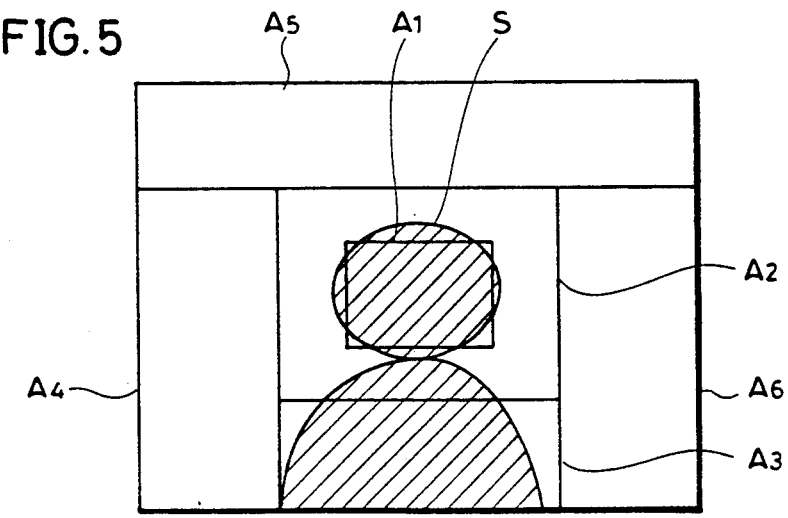
FIG. 5 is a diagram showing one example of an image sensed picture.

For example, as the above-described conventional art, if the regions A1, A2 and A3 having the highest probability of including the object are simply given the same priority as the regions A4, A5 and A6 and a picture is taken of the object S in the rear light state, as in FIG. 5, only the region A2 includes a bright background, so that an adequate correction of exposure can not be made for the object S. Then, with the application of the rules 1 through 4, both the regions A1 and A3 are dark and only the region A2 is bright, whereby the equation $V1 \approx V3 \neq V2$ is established among the normalized luminance evaluating values V1, V2 and V3. The first and second conditions of the rule 1, the second condition of the rule 3 and the first condition of the rule 4 are difficult to satisfy. Consequently, only the rule 2 is to be satisfied with a high probability and the regions A1 and A3 are given higher priorities. Accordingly, placing importance on the subject S included in these regions A1 and A3, the optimum exposure can be obtained for the object S. The series of rules are effective in rear light and excessive follow light states.

The rule 5 is for a case wherein the entire picture is dark, in which when the maximum of the normalized luminance evaluating values is not large, the priority processing will not be performed and a mean value of the picture is made a representative value. In addition, the following rule 5' can be substituted for the rule 5 as a rule when the entire picture is dark.

Rule 5'

"If the aperture of the diaphragm is considerably opened, then all the regions are given the same priority"

Figure 13:
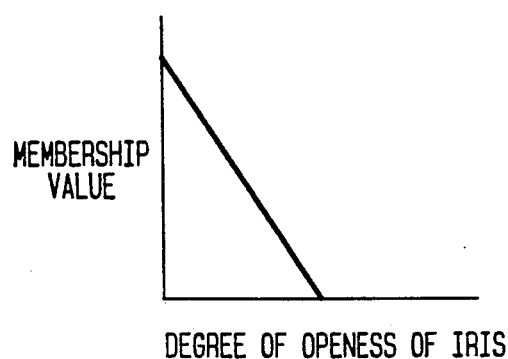
FIG. 13 is a graph showing a membership function of rule 5' which is a variation of the rule 5 according to the first embodiment of the present invention.

The rule 5' is for detecting the darkness of the image sensed picture based on the size of the aperture of the iris mechanism 2, wherein when the aperture is considerably opened, that is, when the openness of the aperture is considerably large, it is determined that the image sensed picture is dark, all the regions are given the same priority and unnecessary correction of exposure is prevented. A membership function of the rule 5' with the openness of the aperture as an input variable is illustrated as FIG. 13, wherein priorities of the respective regions are as the following equation:

$$w'_{51} = w'_{52} = w'_{53} = w'_{54} = w'_{55} = w'_{56} = 1.$$

In addition, FIG. 14 is a block diagram showing one example of an automatic exposure adjusting apparatus implementing such rule 5'. In FIG. 14, the detection of the openness of the aperture can be obtained by various methods, such as A/D converting a driving voltage value for driving the iris mechanism 2 by an A/D converter 200 and feed backing the A/D converted value to the priority determining circuit 57, driving the iris mechanism 2 by a stepping motor a rotor location of which can be detected and making the openness correspondent to the number of steps in a direction of the opening of the aperture, or providing an additional sensor for detecting the openness. The degree of the stop-down of the iris mechanism 2 is changed in inverse proportion to a voltage value of the comparator 72. Namely, the openness is changed in proportion to the above-described voltage value. Both the above-described rules 5 and 5' can be used as a rule for a case the entire picture is dark.

The rule 6 is for a case in which an extremely high luminance portion such as a light source is included in the picture, wherein even though the maximum of the normalized luminance evaluating value Yi is not small, if the simple mean value $Z_1$ is small and consequently the picture is dark as a whole, the lower luminance regions are given priorities. On this occasion, if the picture includes a light source or the like, although the regions including the light source have a sufficient normalized luminance evaluating value, the simple mean value $Z_1$ becomes small and the picture becomes dark. In this case, exposure for the major object is improved by giving the regions without the light source and having lower normalized luminance evaluating values higher priorities to reduce the influence of the light source.

Meanwhile, in case a picture is intentionally taken of the abnormal luminance portion, the following rule 6' can be substituted for the rule 6.

Rule 6'

"If max (Vi) is not small and a simple mean value is small, then the region A1 is given a priority"

The rule 6' corresponds to a case wherein an extremely high luminance portion such as a light source, that is, an abnormal luminance portion is included in the picture. Namely, since the abnormal luminance portion is included in any of the regions, while the maximum of the normalized luminance evaluating values Vi is not small, the simple mean value $Z_1$ is small, so that when the entire regions except for the regions including the abnormal luminance portions are dark, the region A1 is unconditionally given the priority, unlike the above-described rule 6.

Then, with a dark background, if the user locates the abnormal luminance portion in the region A1 at the center of the picture in order to take a picture of the same, while the maximum value of normalized luminance evaluating values Vi attains V1, a large value, as the foregoing, the simple mean value $Z_1$ becomes small, so that the region Al is given the priority. Accordingly, adjustment of exposure is made such that a luminance level of the region A1 attains an optimum level, that is, the abnormal luminance portion in the region A1 enters an optimum exposure state, thereby enabling taking a picture of the abnormal luminance portion. On this occasion, the regions A2 through A6 are in a dark state of extremely low luminance as a result of the above-described adjustment of exposure, but it can not be helped because the highest priority is placed on taking a picture of the abnormal luminance portion.

In addition, when the abnormal luminance portion is included in any of the regions except for the region A1 and the region A1 includes another object of lower luminance than the abnormal luminance portion, the picture is in so-called rear light state, wherein the maximum of the normalized luminance evaluating values Vi becomes a normalized luminance evaluating value of the region including the abnormal luminance portion, attaining a large value. Namely, because it is in rear light state, other regions than the region including the abnormal luminance portion become dark, the simple mean value $Z_1$ becomes small and the region A1 is given a higher priority also in this case. Accordingly, adjustment of exposure is made such that the optimum exposure is obtained for the major object in the region A1 by reducing the influence of the abnormal luminance portion.

Now, description will be given of the second embodiment according to the present invention using the above-described rules 1, 2, 4, 5 and 6' as the rules 1, 2, 3, 7 and 8 as well as additional rules which will be described in the following as the rules 4, 5, 6 and 9. The additional rules 4, 5, 6 and 9 for use in the second embodiment are as follows.

Rule 4

"If V1 is close to the simple mean value, V1 and V2 are not close to each other and V1 and V3 are not close to each other, then the region A1 is given priority"

Rule 5

"If V1 is larger than the simple means value, V1 and V2 are not close to each other and V1 and V3 are not close to each other, then the regions A2 and A3 are given priority"

Rule 6

"If V1 is smaller than the simple mean value, V1 and V2 are not close to each other and V1 and V3 are not close to each other, then the regions A2 and A3 are given priority"

Rule 9

"If (V1+V2+V3)/(3×simple mean value) is large, then all the regions are given the same priority".

FIGS. 15 through 18 are graphs showing membership functions defining these additional rules 4, 5, 6 and 9, respectively. Now, detailed descriptions will be given of the additional rules 4, 5, 6 and 9 in the following.

Rule 4 as shown in FIG. 15(a) is defined by a chevron-shaped membership function with a ratio $V1/Z_1$ of normalized luminance evaluating value V1 to the simple mean value $Z_1$ as an input variable and attaining the maximum value at $V1/Z_1=1$ and a V-shaped membership function with V2/V1 and V3/V1 as input variables as shown in FIGS. 15 (a) and 15 (b). Then, a membership value $u_{41}$ for the first condition of the rule 4 that "V1 is close to the simple mean value" is obtained from the membership function shown in FIG. 15(a), a membership value $u_{42}$ for the second condition of the rule 4 that "V1 and V2 are not close to each other" is obtained from the membership function shown in FIG. 15(b) and a membership value $u_{43}$ for the third condition of the rule 4 that "V1 and V3 are not close to each other" is obtained from the membership function shown in FIG. 15(c), so that in the step 101 of FIG. 6 the smallest one of the membership values $u_{41}$, $u_{42}$ and $u_{43}$ is selected as U4, the degree that the rule 4 is satisfied. In case of FIGS. 15(a)–15(c), since $u_{43} > u_{41} > u_{42}$, then U4 is set to be equal to $u_{42}$.

Rule 5 is defined by a membership function including a simple increasing line with $V1/Z_1$ as an input variable as in FIG. 16 (a) and a V-shaped membership function as FIGS. 16 (b) and 16 (c). The membership functions of FIGS. 16 (b) and 16 (c) are exactly the same as those of FIGS. 15 (b) and 15 (c).

A membership value $u_{51}$ for the first condition of the rule 5 that "V1 is larger than the simple mean value", a membership value $u_{52}$ for the second condition of the rule 5 that the "V1 and V2 are not close to each other", and a membership value $u_{53}$ for the third condition of the rule 5 that "V1 and V3 are not close to each other" are obtained from the membership functions shown in FIGS. 16(a), 16(b) and 16(c), respectively, so that in the step 101, the smallest one of the membership values $u_{51}$, $u_{52}$ and $u_{53}$ is selected as U5 which is the degree that the rule 5 is satisfied. In case of FIGS. 16(a) and 16(c) since $u_{53} > u_{52} > u_{51}$, then U5 is set to be equal to $u_{51}$.

Rule 6 is defined by a membership function including a simple decreasing line with $V1/Z_1$ as an input variable as FIG. 17 (a) and V-shaped membership function as FIGS. 17 (b) and 17 (c). The membership functions of FIGS. 17 (b) and 17 (c) are exactly the same as those of FIGS. 15 (b) and 17 (c).

A membership value $u_{61}$ for the first condition of the rule 6 that "V1 is larger than the simple mean value", a membership value $u_{62}$ for the second condition of the rule 6 that "V1 and V2 are not close to each other", and a membership value $u_{63}$ for the third condition of the rule 6 that "V1 and V3 are not close to each other" are obtained from the membership functions shown in FIGS. 17(a), 17(b) and 17(c), respectively, so that in step 101 the smallest one of the membership values $u_{61}$, $u_{62}$ and $u_{63}$ is selected as U6, the degree that the rule 6 is satisfied. In case of FIGS. 17(a)–17(c) since $u_{63} > u_{62} > u_{61}$, then U6 equals $u_{61}$.

Figure 18:
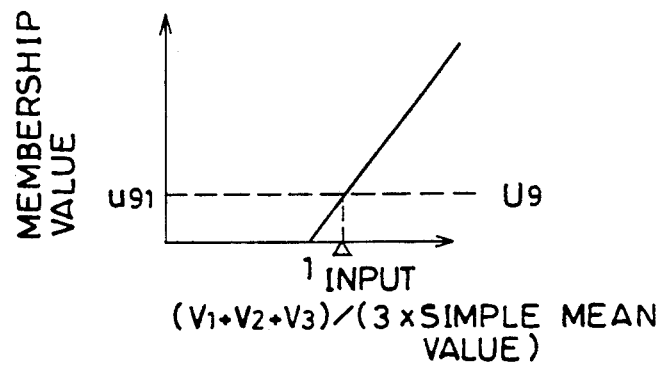
FIG. 18 is a graph showing a membership function of rule 9 according to the second embodiment of the present invention.

Rule 9 is defined as shown in FIG. 18 by a membership function with $(V1+V2+V3)/(3 \times Z_1)$, a ratio of a mean value $(V1+V2+V3)/3$ of the normalized luminance evaluating values V1 through V3 of the regions A1 through A3 having high probabilities of including the major object to the simple mean value $Z_1$ of all the normalized luminance evaluating values V1 through V6 as an input variable, and having a simple increasing line indicating the largeness of the input variable, wherein the settlement of the mean value $(V1+V2+V3)/3$ and the simple mean value $Z_1$ unconditionally determines a membership value $u_{91}$ In step 101, since there is only one membership value for the rule 9, U9, the degree that the rule 9 is satisfied, is set to be equal to $u_{91}$.

As the foregoing, when the determination is made that calculation of the degree Ui (i=1–9) that a rule is satisfied is completed for all the rules including the above-described additional rules 4, 5, 6 and 9, similarly to the above-described first embodiment, calculation of the priorities Wk (k=1–6) for the respective regions is made. The priority Wk is computed by weighting the conclusion portion with a degree that each rule is satisfied and obtaining the weighted average thereof as expressed in the following equation.

$$Wk = \sum_{i=1}^{9} Ui \cdot wik / \sum_{i=1}^{9} Ui (k = 1\text{-}6) \quad (A')$$

wherein wik is a priority for each rule in each region and is set individually for each rule. Priorities of the additional rules 4, 5, 6 and 9 will be described in the following.

In the rule 4, in order to indicate "the region A1 is given a priority" as a conclusion portion, priorities $w_{41}$ through $w_{46}$ of the respective regions are previously set as follows.

$w_{41} = 3$ $w_{42} = w_{43} = w_{44} = w_{45} = w_{46} = 1$

In the rule 5, in order to indicate "the regions A2 and A3 are given priorities", priorities $w_{51}$ through $w_{56}$ of the respective regions are previously set as follows.

$w_{52} = w_{53} = 3$ $w_{51} = w_{54} = w_{55} = w_{56} = 1$

In the rule 6, in order to indicate "the regions A2 and A3 are given priorities" as a conclusion portion, priorities $w_{61}$ through $w_{66}$ of the respective regions are previously set as follows.

$$w_{62} = w_{63} = 3$$

$$w_{61} = w_{64} = w_{65} = w_{66} = 1$$

In the rule 9, in order to indicate "all the regions are given the same priority" as a conclusion portion, priorities $w_{91}$ through $w_{96}$ of the respective regions are previously set as follows.

$$w_{91} = w_{92} = w_{93} = w_{94} = w_{95} = w_{96} = 1$$

Considering a priority Wk in the second embodiment by taking all the rules in consideration by using all priorities of the respective regions for the respective rules, the equation (A') can be obtained for the region A1.

$$W_1 = \sum_{i=1}^{9} U_i \cdot w_{i1} / \sum_{i=1}^{9} U_i \quad (B')$$

Since in this equation (B') it can be shown as follows:

$$\sum_{i=1}^{9} U_i \cdot w_i = U_1 \cdot w_{11} + U_2 \cdot w_{21} + \ldots + U_9 \cdot w_{91}$$
$$= u_{11} \cdot 3 + u_{22} \cdot 3 + u_{32} \cdot 3 +$$
$$u_{42} \cdot 3 + u_{51} \cdot 1 + u_{61} \cdot 1 +$$
$$u_{71} \cdot 1 + u_{82} \cdot 3 + u_{91} \cdot 1$$

$$\sum_{i=1}^{9} U_i = U_1 + U_2 + U_3 + U_4 + U_5 + U_6 +$$
$$U_7 + U_8 + U_9$$
$$= u_{11} + u_{22} + u_{32} + u_{42} + u_{51} + u_{61} +$$
$$u_{71} + u_{82} + u_{91}$$

the priority W1 of the region A1 is expressed as follows.

$$W_1 = (3u_{11} + 3u_{22} + 3u_{32} + 3u_{42} + u_{51} +$$
$$u_{62} + U_{71} + 3u_{82} + u_{91})/$$
$$(u_{11} + u_{22} + u_{32} + u_{42} + u_{51} +$$
$$u_{61} + u_{71} + u_{82} + u_{91})$$

Similarly, the priorities $W_2$ through $W_6$ are computed as follows.

$$W_2 = (3u_{11} + u_{22} + 3u_{32} + u_{42} + 3u_{51} +$$
$$3u_{61} + u_{71} + u_{82} + u_{91})/ \sum_{i=1}^{9} U_i$$

$$W_3 = (u_{11} + 3u_{22} + 3u_{32} + u_{42} + u_{51} +$$
$$3u_{61} + u_{71} + u_{82} + u_{91})/ \sum_{i=1}^{9} U_i$$

$$W_4 = (u_{11} + u_{22} + u_{32} + u_{42} + u_{51} + u_{61} +$$
$$u_{71} + u_{82} + u_{91})/ \sum_{i=1}^{9} U_i$$

-continued $$W_5 = (u_{11} + u_{22} + u_{32} + u_{42} + u_{51} + u_{61} +$$
$$u_{71} + u_{82} + u_{91})/ \sum_{i=1}^{9} U_i$$

$$W_6 = (u_{11} + u_{22} + u_{32} + u_{42} + u_{51} + u_{61} +$$
$$u_{71} + u_{82} + u_{91})/ \sum_{i=1}^{9} U_i$$

The priority Wk of each region for all the rules thus determined by the fuzzy inference is applied to the weighting circuits 61 to 66 in parallel. The priority processings by the weighting circuits 61 through 66 and the weighted mean value circuit 67 are the same as those of the above-described first embodiment, and therefore no description will be made thereof.

Now, description will be made for each rule how the additional rules 4, 5, 6 and 9 influence the adjustment of exposure.

The additional rules 4 through 6 are countermeasures for the cases not covered by all the conditions of the rules 1 through 3. The rule 4 is that in a state wherein the region A1 among the regions A1 through A3 is of a normal luminance level, that is, wherein both the regions A2 and A3 include abnormal luminance portions under a condition that the region A1 does not include the abnormal luminance portion and the evaluating value V1 is close to the simple mean value $Z_1$, correction of the rear light and excessive follow light is made by eliminating the influence of the abnormal luminance portions by giving the region A1 a higher priority while achieving the priority of the center, taking into consideration that the region A1 at the center of the picture has a significantly high probability of including the major object among the regions A1 through A3 in a normal state of taking a picture.

The rules 5 and 6 are that when the evaluating values V2 and V3 are largely different from the evaluating value V1 under the condition that the region A1 includes the abnormal luminance portion, correction of the rear light and excessive follow light is made by eliminating the influence of the abnormal luminance portions by determining that the regions A2 and A3 do not include the abnormal luminance portion, refraining from giving the region A1 a priority and giving the regions A2 and A3 higher priorities while achieving the sub-priority of the center.

Now, the rule 9 is for a picture of excessive follow light. In this excessive follow light state, only the luminance levels of the regions A1 through A3 having high probabilities of including an extremely bright major subject S become significantly high, so that a mean value (V1+V2+V3)/3 of the normalized luminance evaluating values V1, V2 and V3 of the three regions becomes larger than the simple mean value $Z_1$ of the entire picture. According thereto, the input variable of the membership function for the rule 9 is increased, so that the membership value $U_9$ becomes larger. In proportion to the rise of the membership value $U_9$, the action of giving all the regions the same priority without the priority processing is enhanced. This action results in the addition of factors that all the regions are given the same priority for the correction performed by the rules 1 through 6. In other words, by inversely controlling the priority processings in the rules 1 through 6 to prevent such priority processing as is performed in the rear light state, the background of the object is prevented from becoming dark in an excessive follow light state.

Figure 19:
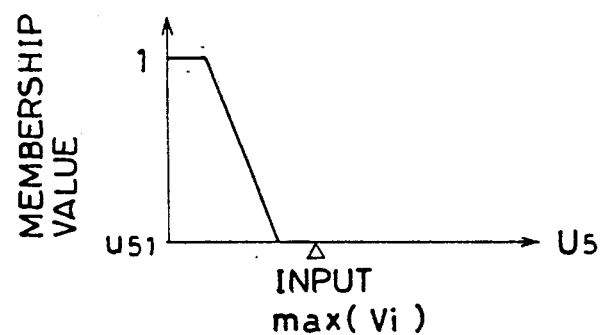
FIG. 19 is a graph showing a membership function of rule 5'' according to a third embodiment of the present invention.
Figure 20:
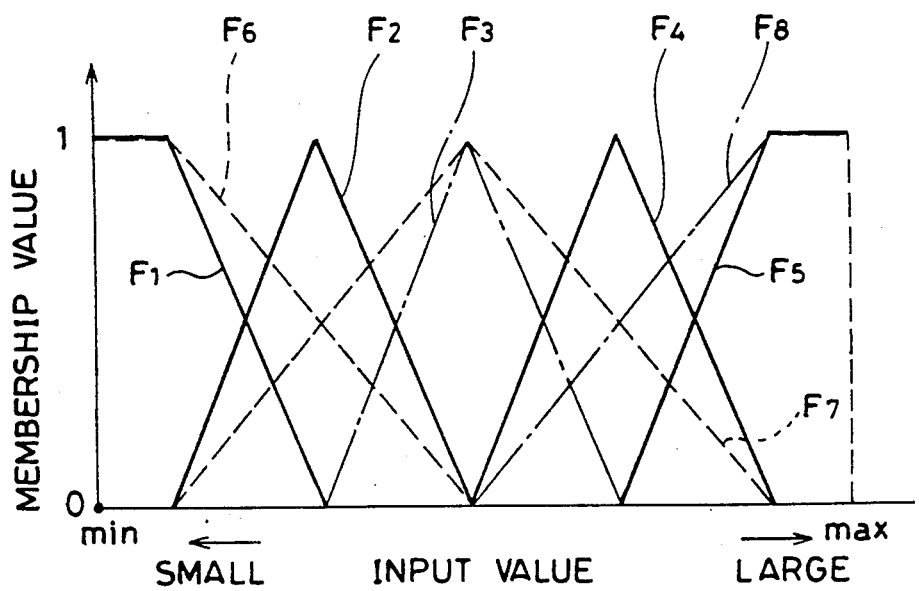
FIG. 20 is a graph showing types of membership functions.

For example, functions on which the membership functions for use in the rules 1 through 6 according to the above-described first embodiment are based are previously prepared in a memory 300. Namely, as shown in FIG. 20, the memory 300 stores eight functions F1 through F8, a membership value of which varies with a predetermined gradient with respect to each input value. Now, configurations of these functions will be described in brief. Herein, as a rule 5, a rule 5'' that "if max (Vi) (i=1−6) is considerably small, then all the regions have the same priority" is used in place of the rule the above-described rule 5 of FIG. 11, and a condition thereof is defined by the membership function of FIG. 19.

Function F1

A function having an decreasing line of a steep gradient on which a membership value is fixed at 1 when an input value is small, significantly decreases as the input value becomes larger and furthermore is fixed to 0 as the input value further increases.

Function F2

A chevron-shaped function of a steep gradient having its maximum point of a membership value at a point of a relatively small input value.

Function F3

A chevron-shaped function having the same gradient as that of the function F2 and a maximum point located at approximately a center of a horizontal axis at which an input value is larger than the maximum point of the function F2.

Function F4

A chevron-shaped function having the same gradient as that of the function F3 and a maximum point located at which an input value is larger than the maximum point of function F3.

Function F5

A function having an increasing line of a steep gradient on which a membership value is fixed at 0 when an input value is small, significantly increases as the input value becomes larger and is fixed to 1 as the input value further increases.

Function F6

A function having a decreasing line of a gradient more gentle than that of the function F1 on which a membership value is fixed at 1 when an input value is small, gradually decreases as the input value becomes larger and it is fixed at 0 when the input value further increases.

Function F7

A chevron-shaped function of a gradient more gentle than that of the function F3 on which a maximum point is located at the same point as the maximum point of the function F3.

Function 8

A function having an increasing line of a gradient more gentle than that of the function F5 on which a membership value is fixed at 0 when an input value is small, gradually increases as the input value larger and fixed at 1 when the input value further increases.

The input value on the horizontal axis of FIG. 20 does not have specific input values, for example, $V2/V1$ and max (Vi) are not specified, i.e. they are unspecified.

As the foregoing, in performing the priority determining processing based on each rule by the priority determining circuit 57, the memory 300 selects each time the function having a configuration necessary for each rule. Then, a specific input variable is provided on the horizontal axis of the selected function.

Namely, the function F3 is selected in the processing of the first condition (FIG. 7($a$)) of the rule 1 of the first embodiment, then, $V2/V1$ is specified as an input value of the function F3 and scales of the horizontal axis are set such that the function reaches its maximum point at input value of $V2/V1=1$ and $V2/V1$ attains its minimum value (min) at the opposite ends of the horizontal axis. The function F3 is selected also for the second condition (FIG. 7($b$)) of the rule 1. Then, $V3/V1$ is designated as an input value of the function F3 and scales of the horizontal axis are set such that the function reaches its minimum value at input value of $V3/V1=1$ and $V3/V1$ attains maximum values at the opposite ends of the horizontal axis. However, the function F3 is an inversion of the membership function of FIG. 7 ($b$), it is so-called "negation", and a membership value for the second condition can be obtained by subtracting the membership value obtained by the function F3 from 1.

Similarly, the function F3 is selected for each condition of the rules 2 through 4 of the first embodiment shown in FIGS. 8($a$) through 10($b$), and for the first condition of each rule, $V2/V1$ is designated as input value and for the second condition thereof $V3/V1$ is designated as the same, thereby setting scales of the horizontal axis. The membership values of the first condition of the rule 2 and the first and second conditions of the rule 3 can be obtained by subtracting the membership value obtained by the function F3 from 1.

In the processing of the first condition of the rule 6 (FIG. 12), first the function F6 which is the "negation" of the membership function of FIG. 12 ($a$) is selected, max (Vi) is designated as an input value and scales of the horizontal axis are set at an equal interval such that max (Vi) expectedly attains a maximum value (for example 100) and a minimum value (for example 0) at the opposite ends of the horizontal axis. The membership value of FIG. 12 ($a$) can be obtained by subtracting the membership value obtained from the function F6 from 1. With respect to the second condition of the rule 6, the function F6 is selected, a simple mean value $Z_1$ is designated as an input value and scales of the horizontal axis are set such that the mean value $Z_1$ expectedly attains maximum and minimum values at the opposite ends of the horizontal axis. As a result, the membership value obtained from the function F6 becomes the membership value of FIG. 12 ($b$).

With respect to the processing of the rule 5'', taking into consideration "considerably" in "max (Vi) is considerably small", the function (F1) is selected. This function has a gradient steeper than that of the function F6 that is selected based on "max (Vi) is small" and which is the negation of "max (Vi) is not small" to obtain the membership value of FIG. 19. Herein, max (Vi) is set on the horizontal axis of the function F1 similarly in the first condition of the rule 6, and scales of the vertical axis are provided in exactly the same manner as that of the first condition of the rule 6. Accordingly, membership values of the fist conditions of the rules 5 and 6 are determined by the functions F1 and F6 on the same coordinates.

As the foregoing, under the first conditions of the rules 5" and 6, functions of different gradients are used for the same input variable (max (Vi)). In order to achieve this by using only the functions of steep gradients, normalization with respect to the aggregation has to be done over again and which has to be considered to be different inputs with different horizontal axis scales. According to the above described embodiments, these troublesome processings can be omitted.

Meanwhile, the technique of providing a memory storing a plurality of functions used as basis for membership functions can be also applied to other electronic products such as a fully automatic type washing machine and a room air conditioner.

The division of the regions and the setting of the respective rules are not limited to those described in the above-described embodiments but may take various forms. In addition, it goes without saying that the operations of the switching circuit 26 and the divider 69 can be processed in a software manner by using a microcomputer.

Figure 21:
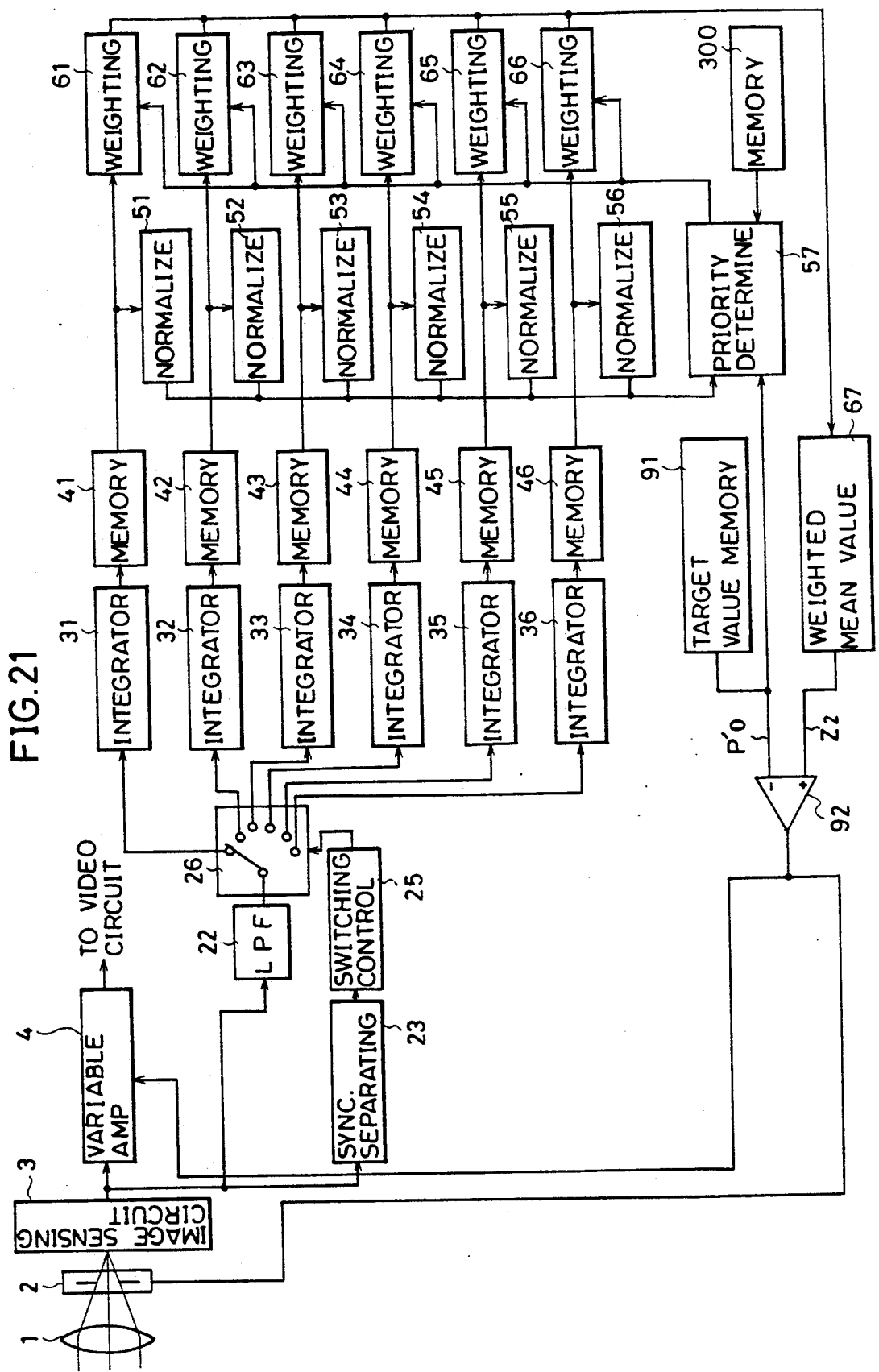
FIG. 21 is a block diagram showing an automatic exposure adjusting apparatus according to a fourth embodiment of the present invention.

Furthermore, in the above-described embodiments, an optimum control of exposure is achieved by previously setting an optimum target level $P_0$ of the image sensed picture without considering the luminance distribution and comparing a value obtained by multiplying the optimum target level $P_0$ by a division value m which is a ratio of the simple mean value $Z_1$ to the weighting mean value $Z_2$ as a correction value with the output of the integrator 90 indicating a luminance level of the video signal. However, it is also possible to directly compare the weighted mean value $Z_2$ with the target level $P_0'$ ($P_0'$ is a digitized value of the above-described target level $P_0$) stored in the target level memory 91 by the comparator 92 as shown in FIG. 21, in order to control the gain of the valuable gain amplifier 4 based on the comparison result and also control the size of the aperture of the optical iris mechanism 2 to electrically and optically adjust the exposure. For example, when the weighted mean value $Z_2$ is smaller than the target level $P_0'$, assuming that the image sensed picture with the luminance distribution considered has insufficient exposure as compared with the optimum exposure state, the gain of the variable gain amplifier 4 is increased and the degree of the stop-down of the optical iris mechanism 2 is reduced such that $Z_2 = P_0'$ to increase the luminance. On the contrary, when the weighted mean value $Z_2$ is larger than the target level $P_0'$, assuming that the image sensed picture has excess exposure as compared with the optimum exposure state, the gain of the variable gain amplifier 4 is reduced and the degree of the stop-down of the iris mechanism 2 is increased such that $Z_2 = P_0'$, to reduce the luminance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic exposure adjusting apparatus for automatically adjusting exposure based on a video signal obtained from image sensing means (1, 3), comprising:

representative value computing means (22, 31-36, 41-46, 68) for detecting a luminance signal level of said video signal and computing a representative value temporarily representing a luminance level of an entire image sensed picture, correction amount determining means (51-57, 61-67) for determining a correction amount of said temporary representative value in accordance with a luminance distribution in the image sensed picture, and exposure controlling means (2, 4, 5, 69-72) for controlling exposure such that an amount of adjustment of exposure is adjusted in accordance with said temporary representative value and said correction amount, said determination of the correction amount by said correction amount determining means is carried out based on fuzzy inference.

2. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, representative value computing means (68) for computing a representative value temporarily representing a luminance level of the entire image sensed picture based on said luminance evaluating values of the respective regions, correction amount determining means (51-57, 61-67) for determining a correction amount of said temporary representative value in accordance with a correlation of said luminance evaluating values of the respective regions, and exposure controlling means (2, 4, 5, 69-72) for controlling exposure such that an amount of adjustment of exposure is changed in accordance with the said temporary representative value and said correction amount, said determination of the correction amount by said correction amount determining means being carried out based on fuzzy inference with at least said luminance evaluating values of the respective regions or a value arithmetically obtained from said luminance evaluating values as an input variable and said correction amount as a conclusion portion.

3. An automatic exposure adjusting apparatus for automatically adjusting exposure based on a video signal obtained from image sensing means (1, 3), comprising:

representative value computing means (22, 31-36, 41-46, 51-57, 61-67) for detecting a luminance signal level of said video signal and computing a representative value representing a luminance level of an entire image sensed picture, and exposure controlling means (2, 4, 5, 69-72) for controlling exposure such that an amount of adjustment of exposure is changed in accordance with said representative value, said computation of said representative value by said representative value computing means is carried out based on fuzzy inference.

4. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, priority determining means (51-57) for determining a priority of each of said regions, representative value computing means (61-67) for computing a representative value representing a luminance level of the entire image sensed picture by weighting said luminance evaluating values of the respective regions with the priorities determined by said priority determining means, and exposure controlling means (2, 4, 69-72) for controlling exposure such that an amount of adjustment of exposure is changed in accordance with said representative value, said determination of priority by said priority determining means is carried out based on fuzzy inference with at least said luminance evaluating values of the respective regions or a value arithmetically obtained from said luminance evaluating values as an input variable and said priorities as a conclusion portion.

5. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, luminance distribution detecting means (51-57, 61-67) for carrying out fuzzy inference in response to a ratio of luminance evaluating values of two arbitrary ones of said regions among said plurality of regions as an input variable and detecting a luminance distribution of said image sensed picture, and exposure controlling means (2, 4, 5, 69-72) for controlling exposure such that an amount of adjustment of exposure is changed in response to an output of said luminance distribution detecting means.

6. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, priority determining means (51-57, 68) for determining a priority of each of said regions, priority processing means (61-67) for weighting said luminance evaluating values of the respective regions with the priorities determined by said priority determining means, exposure controlling means (2, 4, 5, 69-72) for controlling exposure such that an amount of adjustment of exposure is changed in response to an output of said priority processing means, low luminance detecting means (57) for determining a state wherein an amount of incident light into said imaging sensing means is small to be a low luminance state, and means (57) for limiting the weighting by said priority processing means when the determination of said low luminance state is made.

7. An automatic exposure adjusting apparatus according to claim 6, wherein said low luminance detecting means make a determination of the low luminance state when the maximum value among said luminance evaluating values of the respective regions does not reach a predetermined value.

8. An automatic exposure adjusting apparatus according to claim 6, wherein said exposure controlling means comprises an optical iris mechanism (2) for adjusting the amount of incident light into said image sensing means, and said low luminance detecting means makes a determination of a low luminance state based on the openness of said optical iris mechanism.

9. An automatic exposure adjusting apparatus according to claim 6, wherein said detection of the low luminance state by said low luminance detecting means is carried out based on fuzzy inference.

10. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, priority determining means (51-57, 68) for determining a priority of each of said regions, priority processing means (61-67) for weighting said luminance evaluating values of the respective regions with the priorities determined by said priority determining means, exposure controlling means (2, 4, 5, 69-72) for controlling exposure such that an amount of adjustment of exposure is changed in response to an output of said priority processing means, low luminance detecting means (57) for determining a state wherein an amount of incident light into said image sensing means is small to be a low luminance state, and means (57) for limiting the weighting by said priority processing means when the determination of said low luminance state is made.

11. An automatic exposure adjusting apparatus according to claim 10, wherein said high luminance detecting means determines that the high luminance portion is included when a mean value of said luminance evaluating values of the respective regions does not reach a reference value and the maximum value of said luminance evaluating values exceeds a predetermined value.

12. An automatic exposure adjusting apparatus according to claim 10, wherein said detection of said high luminance portion by said high luminance detecting means is based on fuzzy inference.

13. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, priority determining means (51-57, 68) for determining a priority of each of said regions, priority processing means (61-67) for weighting said luminance evaluating values of the respective regions with the priorities determined by said priority determining means, exposure controlling means (2, 4, 5, 69-72) for controlling exposure such that an amount of adjustment of exposure is changed in response to an output of said priority processing means, means (57) for increasing the priority of each region within a plurality of specific ones of said regions whenever all of said specific regions have approximately equal luminance evaluating values.

14. An automatic exposure adjusting apparatus according to claim 13, wherein said plurality of specific regions is provided near the center of said image sensed picture.

15. An automatic exposure adjusting apparatus according to claim 14, wherein said plurality of specific ones of said regions includes at least a first region provided at a center of said image sensed picture, a second region provided so as to surround said first region and a third region provided at a lower side of said second region.

16. An automatic exposure adjusting apparatus according to claim 13, wherein said determination of priority by said priority determining means is carried out based on fuzzy inference.

17. An automatic exposure adjusting apparatus for automatically adjusting exposure based on a video signal obtained from image sensing means (1, 3), comprising:

means (23, 25, 26) for providing a plurality of divided regions of an image sensed picture including at least a first region provided at a center of said image sensed picture, a second region provided so as to surround said first region and a third region provided at a lower side of said second region.

luminance evaluating value detecting means (22, 31-36, 41-46) for detecting a luminance signal level of said video signal in each of said plurality of regions and supplying the luminance signal level as a luminance evaluating value of the corresponding region, priority determining means (51-57), 68) for determining a priority of each of said regions, priority processing means (61-67) for weighting said luminance evaluating values of the respective regions with the priorities determined by said priority determining means, exposure controlling means (2, 4, 5, 69-72) for controlling exposure such that an amount of adjustment of exposure is changed in response to an output of said priority processing means, and means (57) for increasing the priorities of said second and third regions when the luminance evaluating value of said first region is at abnormally high level or an abnormally low level and the luminance evaluating values of said second and third regions are not close to said luminance evaluating value of said first region.

18. An automatic exposure adjusting apparatus according to claim 17, wherein said determination of said priorities is made based on fuzzy inference as to whether said luminance evaluating value of said first region is at an abnormally high level or at an abnormally low level and said luminance evaluating values of said second and third regions are close to said luminance evaluating value of said first region or not.

19. An automatic exposure adjusting apparatus for automatically adjusting exposure based on a video signal obtained from image sensing means (1, 3), comprising:

means (23, 25, 26) for providing at least one major region and a plurality of non-major regions by dividing an image sensed, picture, luminance evaluating value detecting means (22, 31-36, 41-46) for detecting a luminance signal level of said video signal in each of said plurality of regions and supplying the luminance signal level as a luminance evaluating value, priority determining means (51-57, 68) for determining a priority of each of said regions, priority processing means (61-67) for weighting said luminance evaluating values of the respective regions with the priorities determining by said priority determining means, exposure controlling means (2, 4, 5, 69-72) for controlling exposure such that an amount of adjustment of exposure is changed in response to an output of said priority processing means, abnormal luminance portion determining means (57) for determining whether any of said regions includes an abnormal luminance portion or not, and means (57) for giving said major regions a priority greater than that of said non-major regions when said abnormal luminance portion is detected.

20. Automatic exposure adjusting apparatus according to claim 19, wherein
    said major region is provided at the center of said image sensed picture.

21. Automatic exposure adjusting apparatus according to claim 19, wherein said detection of the abnormal luminance portion by said abnormal luminance portion detecting means is carried out based on fuzzy inference.

22. An automatic exposure adjusting apparatus for automatically adjusting exposure based on a video signal obtained from image sensing means (1, 3), comprising:

means (23, 25, 26) for setting a plurality of divided regions on an image sensed picture, luminance evaluating value detecting means (22, 31-36, 41-46) for detecting a luminance signal level of said video signal in each of said plurality of regions and supplying the luminance signal level as a luminance evaluating value of the corresponding region, priority determining means (51–57, 68) for determining a priority of each of said regions, priority processing means (61–67) for weighting said luminance evaluating values of the respective regions with the priorities determined by said priority determining means, exposure controlling means (2, 4, 5, 69–72) for controlling exposure such that an amount of adjustment of exposure is changed in response to an output of said priority processing means, means (57) for detecting that said luminance evaluating value of a region having higher priority is larger than the luminance evaluating value of a region having a lower priority, and means (57) for limiting the weighting by said priority processing means when said determination is made that said luminance evaluating value of the region having the higher priority is larger than the luminance evaluating value of the region having the lower priority.

23. An automatic exposure adjusting apparatus according to claim 22, wherein said determination is made based on fuzzy inference as to whether said luminance evaluating value of the region having the higher priority is larger than the priority evaluating value of the region having the lower priority or not.

24. An automatic adjusting apparatus comprising:
fuzzy controlling means for performing a predetermined control based on fuzzy inference with a predetermined input variable, and holding means for holding in advance a plurality of functions of different gradients as membership functions for use in the fuzzy inference.

25. An automatic adjusting apparatus according to claim 24, wherein said fuzzy controlling means comprises exposure controlling means for evaluating exposure of an image sensed picture based on the fuzzy inference and controlling the exposure based on a result thereof.

26. An automatic exposure adjusting apparatus for automatically adjusting exposure based on a video signal obtained from image sensing means (1, 3), comprising:

representative value computing means (22, 31–36, 41–46, 68) for detecting a luminance signal level of said video signal and computing a representative value temporarily representing a luminance level of an entire image sensed picture, correction amount determining means (51–57, 61–67) for determining a correction amount of said temporary representative value in accordance with a luminance distribution in the image sensed picture, and exposure controlling means (2, 4, 5, 69–72) for controlling exposure such that an amount of adjustment of exposure is changed in accordance with said temporary representative value and said correction amount, wherein said determination of the correction amount of said correction amount determining means is carried out using fuzzy inference based on a plurality of rules.

27. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31–36, 41–46) for detecting a luminance signal level of said video signal in each of said plurality of regions and supplying the luminance signal level as a luminance evaluating value of the corresponding region, representative value computing means (68) for computing a representative value temporarily representing a luminance level of the entire image sensed picture based on said luminance evaluating values of the respective regions, correction amount determining means (51–57, 61–67) for determining a correction amount of said temporary representative value in accordance with a correlation of said luminance evaluating values of the respective regions, and exposure controlling means (2, 4, 5, 69–72) for controlling exposure such that an amount of adjustment of exposure is changed in accordance with said temporary representative value and said correction amount, wherein said determination of the correction amount by said correction amount determining means is carried out using fuzzy inference based on a plurality of rules with at least said luminance evaluating values of the respective regions or a value arithmetically obtained from said luminance evaluating values as an input variable and said correction amount as a conclusion portion.

28. An automatic exposure adjusting apparatus for automatically adjusting exposure based on a video signal obtained from image sensing means (1, 3), comprising:

representative value computing means (22, 31–36, 41–46, 51–57, 61–67) for detecting a luminance signal level of said video signal and computing a representative value representing a luminance level of an entire image sensed picture, and exposure controlling means (2, 4, 5, 69–72) for controlling exposure such that an amount of adjustment of exposure is changed in accordance with said representative value, wherein said computation of said representative value by said representative value computing means is carried out using fuzzy inference based on a plurality of rules.

29. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31–36, 41–46) for detecting a luminance signal level of said video signal in each of said plurality of regions and supplying the luminance signal level as a luminance evaluating value of the corresponding region, priority determining means (51–57) for determining a priority of each of said regions, representative value computing means (61–67) for computing a representative value representing a luminance level of the entire image sensed picture by weighting said luminance evaluating values of the respective regions with the priorities determined by said priority determining means, and exposure controlling means (2, 4, 69–72) for controlling exposure such that an amount of adjustment of exposure is changed in accordance with said representative value, wherein said determination of priority by said priority determining means is carried out using fuzzy inference based on a plurality of rules with at least said luminance evaluating values of the respective regions or a value arithmetically obtained from said luminance evaluating values as an input variable and said priorities as a conclusion portion.

30. An automatic exposure adjusting apparatus for automatically adjusting exposure based on a video signal obtained from image sensing means (1, 3), comprising:

means (23, 25, 26) for setting a plurality of divided regions of an image sensed picture, luminance evaluating value detecting means (22, 31-36, 41-46) for detecting a luminance signal level of said video signal in each of said plurality of regions and supplying the luminance signal level as a luminance evaluating value of the corresponding region, luminance distribution detecting means (51-57), 61-67) for carrying out fuzzy inference based on a plurality of rules in response to a ration of luminance evaluating value of two arbitrary ones of said regions among said plurality of regions as an input variable and detecting a luminance distribution of said image sensed picture, and exposure controlling means (2, 4, 5, 69-72) for controlling exposure such that an amount of adjustment of exposure is changed in response to an output of said luminance distribution detecting means.

* * * * *